United States Patent
Kim et al.

(10) Patent No.: US 10,180,741 B2
(45) Date of Patent: Jan. 15, 2019

(54) ELECTRONIC APPARATUS INCLUDING EMISSIVE DISPLAY AND TRANSPARENT DISPLAY AND METHOD OF CONTROLLING SAME

(71) Applicant: SAMSUNG ELECTRONICS CO., LTD., Suwon-si (KR)

(72) Inventors: Yong-ho Kim, Seoul (KR); Joo-ho Kim, Suwon-si (KR); Jin Ra, Suwon-si (KR); Jong-hyun Ryu, Suwon-si (KR); Moon-il Jung, Suwon-si (KR); Hyun-min Song, Suwon-si (KR); Hong-suk Kim, Seoul (KR); Dong-hyun Sohn, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/040,077

(22) Filed: Feb. 10, 2016

(65) Prior Publication Data
US 2016/0349868 A1   Dec. 1, 2016

Related U.S. Application Data

(60) Provisional application No. 62/166,895, filed on May 27, 2015.

(30) Foreign Application Priority Data

Aug. 3, 2015   (KR) .......................... 10-2015-0109617

(51) Int. Cl.
*G09G 5/00* (2006.01)
*G06F 3/041* (2006.01)
(Continued)

(52) U.S. Cl.
CPC ............ *G06F 3/041* (2013.01); *G06F 3/0488* (2013.01); *G09G 3/3406* (2013.01);
(Continued)

(58) Field of Classification Search
CPC .... G09G 3/3433; G09G 3/3406; G06F 3/041; G06F 3/0488
(Continued)

(56) References Cited

U.S. PATENT DOCUMENTS 7,019,714 B2    3/2006   Uchida et al.
9,373,290 B2 *  6/2016   Lee .......................... G09G 3/36
(Continued)

FOREIGN PATENT DOCUMENTS

EP   2 813 884 A1    12/2014
JP   2010-279010 A   12/2010
(Continued)

OTHER PUBLICATIONS

Search Report dated Sep. 8, 2016 issued by the International Searching Authority in counterpart International Application No. PCT/KR2016/005339 (PCT/ISA/210).
(Continued)

*Primary Examiner* — Adam J Snyder
(74) *Attorney, Agent, or Firm* — Sughrue Mion, PLLC

(57) ABSTRACT

An electronic apparatus, including an emissive display configured to provide a first image having a first image quality; a transparent display disposed on the emissive display and configured to provide a second image having a second image quality; and a controller configured to control the emissive display to provide the first image in according to first mode and control the transparent display to provide the second image according to a second mode.

21 Claims, 49 Drawing Sheets

(51) Int. Cl.
*G06F 3/0488* (2013.01)
*G09G 3/34* (2006.01)

(52) U.S. Cl.
CPC .............. *G09G 2300/023* (2013.01); *G09G 2320/0626* (2013.01); *G09G 2330/023* (2013.01); *G09G 2354/00* (2013.01); *G09G 2360/144* (2013.01)

(58) Field of Classification Search
USPC .......................................................... 345/5, 4
See application file for complete search history.

(56) References Cited

U.S. PATENT DOCUMENTS

| | | | | |
|---|---|---|---|---|
| 2007/0078552 | A1* | 4/2007 | Rosenberg | G06F 3/013 700/94 |
| 2008/0007486 | A1* | 1/2008 | Fujinawa | G09G 3/20 345/5 |
| 2008/0192013 | A1* | 8/2008 | Barrus | G06F 1/3203 345/173 |
| 2010/0253671 | A1* | 10/2010 | Perry | G06F 1/3203 345/3.1 |
| 2010/0309096 | A1* | 12/2010 | Inoh | G09G 3/20 345/5 |
| 2010/0333006 | A1* | 12/2010 | Ostergard | G06F 3/044 715/768 |
| 2011/0043435 | A1* | 2/2011 | Hebenstreit | G09G 3/34 345/5 |
| 2011/0050545 | A1* | 3/2011 | Namm | G09G 3/20 345/5 |
| 2011/0080417 | A1* | 4/2011 | Lin | G09G 3/344 345/107 |
| 2012/0032972 | A1 | 2/2012 | Hwang | |
| 2012/0081272 | A1* | 4/2012 | Ogita | G09G 3/20 345/4 |
| 2013/0141310 | A1* | 6/2013 | Joo | G06F 3/1431 345/4 |
| 2013/0155092 | A1* | 6/2013 | Chuang | G09G 3/344 345/4 |
| 2013/0169512 | A1* | 7/2013 | Yang | G09G 3/3208 345/5 |
| 2013/0314338 | A1 | 11/2013 | Nam et al. | |
| 2014/0032327 | A1 | 1/2014 | Prakash et al. | |
| 2014/0304072 | A1 | 10/2014 | Rider et al. | |
| 2015/0138214 | A1 | 5/2015 | Roh et al. | |

FOREIGN PATENT DOCUMENTS

| | | |
|---|---|---|
| JP | 2011-055382 A | 3/2011 |
| JP | 2012-079194 A | 4/2012 |
| JP | 5668031 B2 | 2/2015 |
| KR | 10-2009-0065268 A | 6/2009 |
| KR | 10-2011-0065748 A | 6/2011 |
| KR | 10-2011-0090158 A | 8/2011 |
| KR | 10-2013-0062613 A | 6/2013 |

OTHER PUBLICATIONS

Written Opinion dated Sep. 8, 2016 issued by the International Searching Authority in counterpart International Application No. PCT/KR2016/005339 (PCT/ISA/237).
Communication dated Dec. 15, 2017, issued by the European Patent Office in counterpart European application No. 16800254.1.
Communication dated Mar. 15, 2018, issued by the European Patent Office in counterpart European application No. 16800254.1.
Communication dated Sep. 13, 2018, issued by the European Patent Office in counterpart European Application No. 16 800 254.1.

* cited by examiner

ELECTRONIC APPARATUS INCLUDING EMISSIVE DISPLAY AND TRANSPARENT DISPLAY AND METHOD OF CONTROLLING SAME

CROSS-REFERENCE TO RELATED APPLICATIONS

This application claims priority from Korean Patent Application No. 10-2015-0109617, filed on Aug. 3, 2015, in the Korean Intellectual Property Office, and the benefit of U.S. Provisional No. 62/166,895, filed on May 27, 2015, in the U.S. Patent and Trademark Office, the disclosures of which are incorporated herein by reference in their entireties.

BACKGROUND

Field

Apparatuses and methods consistent with the exemplary embodiments relate to an electronic apparatus and a method of controlling the electronic apparatus, and more particularly, to an electronic apparatus including a dual display having a structure in which an emissive display and a transparent display are stacked, and a method of controlling the electronic apparatus.

Description of Related Art

Many electronic apparatuses make use of various types of displays. For example, some electronic apparatuses use an emissive display (e.g., a liquid crystal display (LCD), an organic light-emitting diode (OLED), etc.) or a transparent display (e.g., a cholesteric liquid crystal (CLC) display, etc.).

These various types of displays may have different characteristics. For example, a transparent display may provide a low-quality image but have a low power characteristic, a high outside visibility characteristic, and a low heat emission characteristic. An emissive display may provide a high-quality image but may have a high power consumption characteristic, a low outside visibility characteristic, and a high heat emission characteristic.

In other words, because the transparent display and the emissive display may provide contrary characteristics to each other, there is a need for methods of complementing drawbacks of the transparent display and the emissive display.

SUMMARY

Exemplary embodiments may overcome the above disadvantages and other disadvantages not described above. Also, the exemplary embodiments are not required to overcome the disadvantages described above, and an exemplary embodiment may not overcome any of the problems described above.

According to an aspect of an exemplary embodiment, an electronic apparatus includes an emissive display configured to provide a first image having a first image quality; a transparent display disposed on the emissive display and configured to provide a second image having a second image quality; and a controller configured to control the emissive display to provide the first image in according to first mode and control the transparent display to provide the second image according to a second mode.

The controller may be configured to selectively operate according to one mode from among the first mode and the second mode based on a type of an application being run by the controller.

The controller may be configured to operate according to the first mode in response to a first application being run, the first application being associated with a high-quality image, and to operate according to the second mode in response to a second application being run, the second application being associated with a low-quality image.

The electronic apparatus may further include: an illuminance sensor configured to acquire an illuminance value of an environment surrounding the electronic apparatus, wherein the controller may be configured to selectively operate according to one mode from among the first mode and the second mode based the illuminance value acquired by the illuminance sensor.

The controller may be configured to operate according to the first mode if the acquired illuminance value is less than a preset value, and to operate according to the second mode if the acquired illuminance value is higher than or equal to the preset value.

The second mode may be a standby mode, and in response to receiving an unlock interaction while the controller operates according to the second mode, the controller may be configured to operate according to the first mode.

The electronic apparatus may further include: a touch sensor configured to sense a user touch, wherein in response to the touch sensor sensing the user touch while the controller operates according to the second mode, the controller may be configured to operate according to the first mode.

The electronic apparatus may further include: a proximity sensor configured to sense a movement of a user, wherein the controller may be configured to operate according to the first mode in response to determining that the user is approaching the electronic apparatus based on the movement, and to operate according to the second mode in response to determining that the user is not approaching the electronic apparatus based on the movement.

The controller may be configured to operate according to a third mode wherein the controller may be configured to control the emissive display to provide a first image having a first image quality in a first area of the emissive display, and to control the transparent display to provide a second image having a second image quality in a second area of the transparent display.

The emissive display may further include an organic light-emitting diode (OLED), and the transparent display comprises a cholesteric liquid crystal (CLC) display.

According to another aspect of an exemplary embodiment, a method of controlling an electronic apparatus includes operating the electronic apparatus according to one from among a first mode and a second mode; when the electronic apparatus is operated according to the first mode, providing a first image having a first image quality through an emissive display; and when the electronic apparatus is operated according to the second mode, providing a second image having a second image quality through a transparent display disposed on the emissive display.

The electronic apparatus may operate the first mode or the second mode according to a type of an application being run by the electronic apparatus.

The method may include, in response to first application being run, the first application being associated with a high-quality image, operating the electronic apparatus in the first mode and providing the first image through the emissive display; and in response to a second application being run, the second application being associated with a low-quality image, operating the electronic apparatus in the second mode and providing the second image through the transparent display.

The method may further include: acquiring an illuminance value of an environment surrounding the electronic apparatus, and operating the electronic apparatus according to one from among the first mode and the second mode based on the acquired illuminance value.

The method may further include: operating the electronic apparatus according to the first mode and providing the first image through the emissive display when the acquired illuminance value is lower than a preset value; and operating the electronic apparatus according to the second mode and providing the second image through the emissive display when the acquired illuminance value is higher than or equal to the preset value.

The second mode may be a standby mode, and the method may further include: in response to an unlock interaction being sensed while operating the electronic apparatus according to the second mode, operating the electronic apparatus according to the first mode.

The method may further include: in response to a user touch being sensed through a touch sensor while operating the electronic apparatus according to the second mode, operating the electronic apparatus according to the first mode.

The method may further include sensing a movement of a user, operating the electronic apparatus according to the first mode and providing the first image in response to determining that the user is approaching the electronic apparatus based on the movement, and operating the electronic apparatus according to in the second mode and providing the second image in response to determining that the user is not approaching the electronic apparatus based on the movement.

The method may further include: operating the electronic apparatus according to a third mode and providing the first image in a first area of the emissive display and simultaneously providing the second image in a second area of the transparent display.

The emissive display may include an organic light-emitting diode (OLED), and the transparent display may include a cholesteric liquid crystal (CLC) display.

According to yet another aspect of an exemplary embodiment, an electronic apparatus, includes an emissive display configured to provide a first image; and a transparent display disposed on the emissive display and configured provide a second image; wherein the first image provided by the emissive display is visible through the transparent display, and the first image is associated with a first image quality that is higher than a second image quality associated with the second image.

BRIEF DESCRIPTION OF THE DRAWINGS

The above and/or other aspects will be more apparent by describing certain exemplary embodiments with reference to the accompanying drawings, in which.

DETAILED DESCRIPTION OF THE EXEMPLARY EMBODIMENTS

Figure 1:
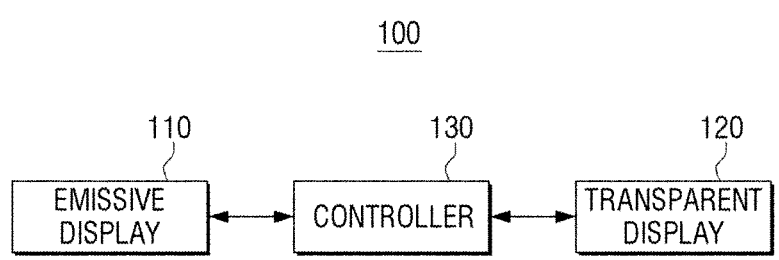
FIG. 1 is a block diagram of a configuration of an electronic apparatus according to an exemplary embodiment.

Certain exemplary embodiments will now be described in greater detail with reference to the accompanying drawings.

In the following description, same drawing reference numerals are generally used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail, as they may obscure the exemplary embodiments with unnecessary detail.

The terms used in exemplary embodiments will be described in brief, and the exemplary embodiments will be described in detail.

The terms used herein are selected as general terms that are currently widely used in consideration of their functions in exemplary embodiments. However, this may depend on intentions of those skilled in the art, precedents, emergences of new technologies, or the like. Also, terms may be arbitrarily selected in a particular case, and detailed meanings of the terms may be described in descriptions of exemplary embodiments corresponding to the particular case. Therefore, the terms used herein may be defined based on meanings of the terms and whole contents of the exemplary embodiments not on simple names of the terms.

Although the terms first, second, third etc. may be used herein to describe various elements, these elements should not be limited by these terms. These terms are only used to distinguish one element from another element. Thus, a first element discussed below could be termed a second element, and, similarly, the second element could be termed the first element, without departing from the teachings of exemplary embodiments. As used herein, the term "and/or," includes any and all combinations of one or more of the associated listed items.

As used herein, singular forms are intended to include the plural forms as well, unless the context clearly indicates otherwise.

It will be further understood that the terms "comprises" and "comprising" when used in this specification, specify the presence of stated features, integers, steps, operations, elements, or components, but do not preclude the presence or addition of one or more other features, integers, steps, operations, elements, components, or groups thereof.

In exemplary embodiments, "module" or "unit" may perform at least one function or operation and may be realized as hardware or software or as a combination of hardware and software. Also, a plurality of "modules" or a plurality of "units" may be integrated into at least one module except "module" or "unit", which needs to be realized as particular hardware, in order to be realized as at least one processor.

It will be understood that when a part is referred to as being "connected" to another part, it can be "directly connected" to the another part, and intervening devices may be "electrically connected".

Also, in exemplary embodiments, a user input may include at least one selected from a touch input, a bending input, a voice input, a button input, and a multimodal input, but is not limited thereto.

In addition, in the exemplary embodiments, an "application" may refer to a set or a series of computer programs that are devised to perform a particular task. Herein, the application may be various. Examples of the application may include a game application, a video play application, a map application, a memo application, a calendar application, a phonebook application, a broadcast application, an exercise support application, a payment application, a photo folder application, etc. but is not limited thereto.

Unless otherwise defined, all terms (including technical and scientific terms) used herein have the same meaning as commonly understood by those skilled in the art to which exemplary embodiments belong. It will be further understood that terms, such as those defined in commonly used dictionaries, should be interpreted as having a meaning that is consistent with their meaning in the context of the relevant art, and should not be interpreted in an idealized or overly formal sense unless expressly so defined herein.

Hereinafter, exemplary embodiments will be described with reference to the drawings. FIG. 1 is a block diagram of a configuration of an electronic apparatus 100 according to an exemplary embodiment. As shown in FIG. 1, the electronic apparatus 100 includes an emissive display 110, a transparent display 120, and a controller 130. The electronic apparatus 100 may be one or more of various types of electronic apparatuses such as a smart watch, a smartphone, a signage, a TV, etc.

The emissive display 110 provides a first image-quality image, which may be an image having a first image quality. In particular, the emissive display 110 may be an opaque display such as a liquid crystal display (LCD), a light-emitting diode (LED), an organic light-emitting diode (OLED), or the like.

The transparent display 120 is disposed on the emissive display 110 to provide a second image-quality image, which may be an image having a second image quality. In particular, the transparent display 120 may be various types of transparent displays such as a cholesteric liquid crystal (CLC) display, a transparent OLED, a transparent LED, etc.

In particular, the transparent display 120 may display a lower-quality image and provide a lower frame speed than the emissive display 110. However, the transparent display 120 may consume a low power, control a transparency, and have a high outside visibility and a low heat emission.

Still referring to FIG. 1, controller 130 controls an overall operation of the electronic apparatus 100. For example, the controller 130 may operate a display mode of the electronic apparatus 100 in one of a first mode and a second mode. In detail, the controller 130 may control the emissive display 110 to provide the first image-quality image through the emissive display 110 when operating in the first mode and control the transparent display 120 to provide the second image-quality image through the transparent display 120 when operating in the second mode.

The controller 130 may operate in one of the first mode and the second mode according to a type of an application that is currently driven or run. In some exemplary embodiments, if an application that provides a high-quality image is running, the controller 130 may operate in the first mode to control the emissive display 110 to provide the first image-quality image. Here, the application that provides the high-quality image may be an application that provides a large number of images or videos, for example a video application, a video call application, a gallery application, or the like. In further exemplary embodiments, if an application that provides a low-quality image is running, the controller 130 may operate in the second mode to control the transparent display 120 to provide the second image-quality image. Here, the application that provides the low-quality image may be an application that provides a large amount of text, for example a memo application, an e-book application, or the like. Also, the controller 130 may operate in one of the first mode and the second mode based on a surrounding illuminance value. In detail, if the surrounding illuminance value is lower than or equal to a preset value, the controller 130 may operate in the first mode to control the emissive display 110 in order to provide the first image-quality image. In other words, the electronic apparatus 100 may use the emissive display 110 in order to enable a viewer to view a high-quality image in a dark environment. If the surrounding illuminance value is higher than or equal to the preset value, the controller 130 may operate in the second mode to control the transparent display 120 to provide the second image-quality image. In other words, the electronic apparatus 100 may use the transparent display 120 that has a high outside visibility in a bright environment.

The controller 130 may also operate a standby mode as the second mode. In other words, the electronic apparatus 100 may provide an image by using the transparent display 120 consuming a low power in the standby mode. Also, if an unlock interaction is sensed when the electronic apparatus 100 operates in the second mode, the controller 130 may change the display mode of the electronic apparatus 100 to the first mode. In other words, the electronic apparatus 100 may provide an image by using the emissive display 110 in a normal mode where the standby mode is released.

In some exemplary embodiments, if a user touch is sensed through a touch sensor when the electronic apparatus 100 operates in the second mode, the controller 130 may change the display mode of the electronic apparatus 100 into the first mode. In other words, if the electronic apparatus 100 is a smart watch, the electronic apparatus 100 may provide an image (a current time image) by using the transparent display 120 in a situation where a user touch input is not sensed and then provide a high-quality image by using the emissive display 100 in a situation where the user touch input is sensed.

Still referring to FIG. 1, the controller 130 may operate in one of the first mode and the second mode based on whether a user approaches. In detail, if it is determined that the user approaches, the controller 130 may operate in the first mode to control the emissive display 110 to provide the first image-quality image. Also, if it is determined that the user does not approach, the controller 130 may operate in the second mode to control the transparent display 120 to provide the second image-quality image. In particular, if the electronic apparatus 100 is a signage that is installed in an outdoor place to provide an advertisement image, the electronic apparatus 100 may provide an image by using the transparent display 120 having a high outside visibility and consuming a low power if no user is approaching, and then provide an image by using the emissive display 110 providing a high-quality image if a user approaches.

In some exemplary embodiments, the controller 130 may operate in a third mode that provides the first image-quality image in a first area of the emissive display 110 and simultaneously provides the second image-quality image in a second area of the transparent display 120. In other words, the controller 130 may simultaneously operate a partial area of the emissive display 110 and a partial area of the transparent display 120 to provide one image.

The electronic apparatus 100 described above may provide an optimum image in consideration of an image quality, a power consumption, a transparency, an outside visibility, a heat emission, etc. according to various situations.

Hereinafter, exemplary embodiments will be described in more detail with reference to FIGS. 2 through 19D.

Figure 2:
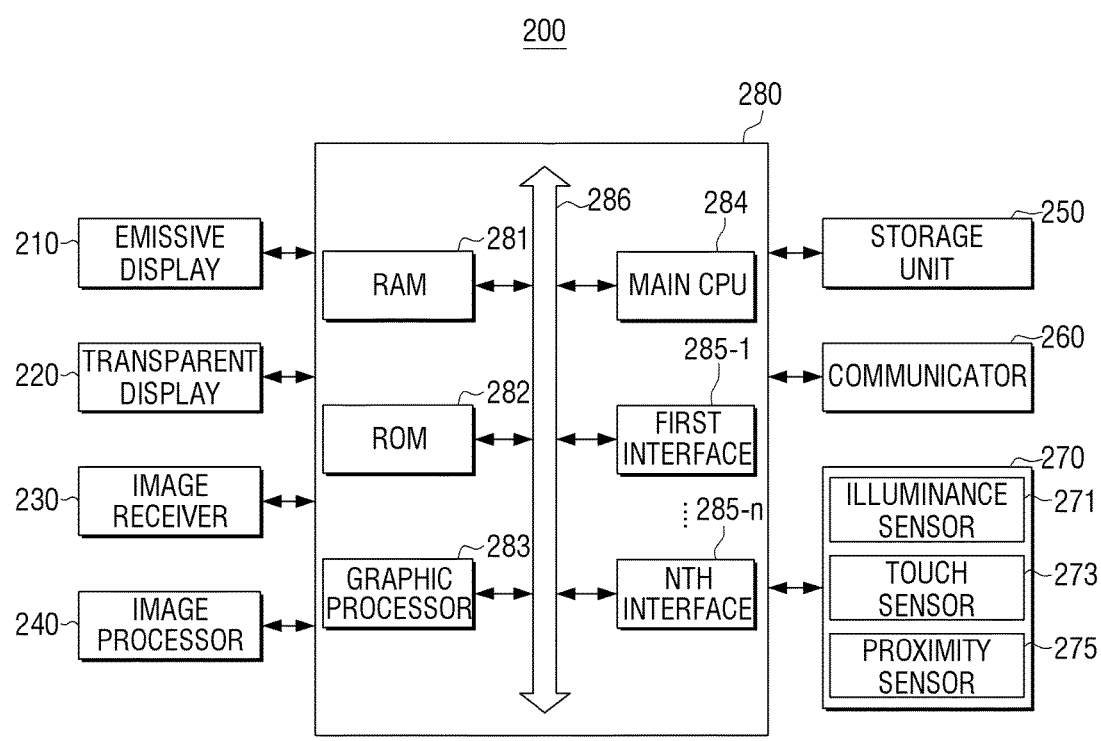
FIG. 2 is a block diagram of a detailed configuration of an electronic apparatus according to an exemplary embodiment.

FIG. 2 is a block diagram showing an example of a detailed configuration of an electronic apparatus 200 according to an exemplary embodiment. As shown in FIG. 2, the electronic apparatus 200 includes an emissive display 210, a transparent display 220, an image receiver 230, an image processor 240, a storage unit 250, which may be a storage, a communicator 260, a sensor 270, and a controller 280.

FIG. 2 illustrates an example of an electronic apparatus 200 that includes various functions, i.e., synthetically illustrates various types of elements. Therefore, according to exemplary embodiments, some of elements of FIG. 2 may be omitted or changed, or other elements may be added.

The emissive display 210 provides a first image-quality image. In particular, the emissive display 210 may be an opaque display, for example various types of displays such as an LCD, an LED, an OLED, etc. In some exemplary embodiments, the emissive display 210 may include additional elements according to a type of the emissive display 210. For example, if the emissive display 210 is an LCD type, the emissive display 210 may include an LCD panel, a backlight unit that supplies light to the LCD panel, and a panel driver board that drives a panel. The transparent display 220 may be disposed on the emissive display 210 to provide the first image-quality image. In particular, the transparent display 220 may be realized as various types of transparent displays such as a CLC display, a transparent OLED, a transparent LED, etc. In particular, the CLC is a liquid crystal where each layer of molecules rotates on a spiral, and a cycle or a color of the spiral may be changed by a temperature, a voltage, an external force, or a contact with a chemical substance. Therefore, the CLC may be realized in a transparent mode that transmits light and a reflective mode that reflects light and may display a color image without a color filter. Also, the CLC has a bistability characteristic, and thus if a state of the CLC is changed once, the CLC has a characteristic of keeping the state. Therefore, the CLC may consume a low amount of power.

Figure 3A:
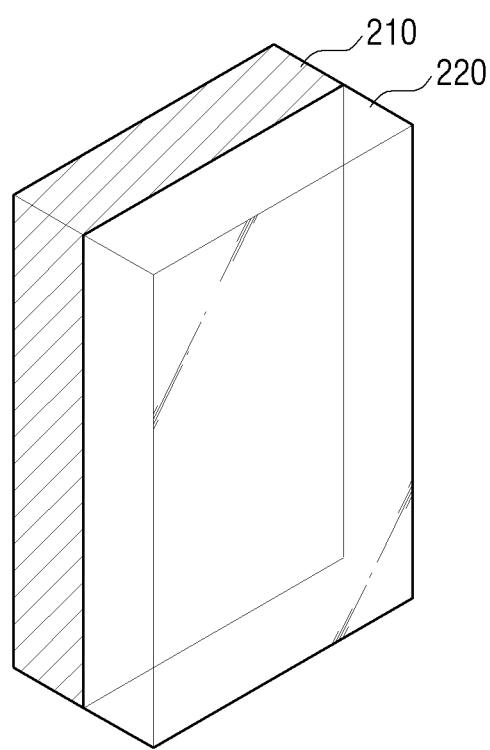
FIGS. 3A to 3D illustrate arrangements of an emissive display and a transparent display according to various exemplary embodiments.

According to an exemplary embodiment shown in FIG. 3A, the emissive display 210 may be disposed at bottom, and the transparent display 220 may be disposed on the emissive display 210. Therefore, if the transparent display 220 is changed into a transparent mode, an image may be output through the emissive display 210. If the transparent display 220 is changed into a reflective mode, an image may be output through the transparent display 220.

Figure 3B:
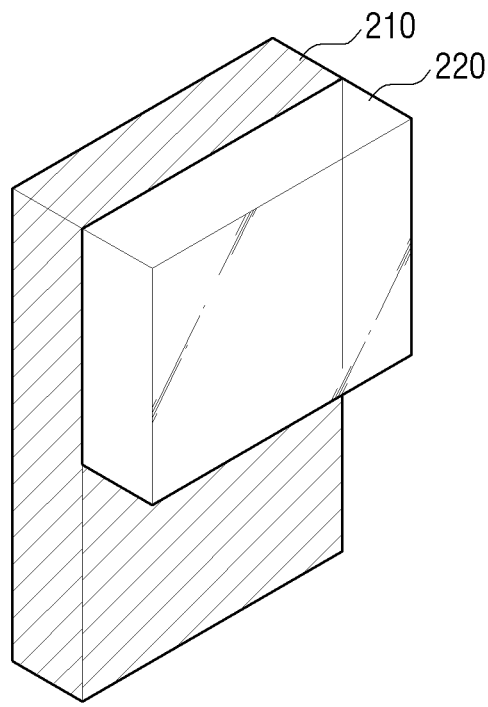

According to another exemplary embodiment, as shown in FIG. 3B, the transparent display 220 may be disposed on the emissive display 210 in a smaller size than the emissive display 210.

Figure 3C:
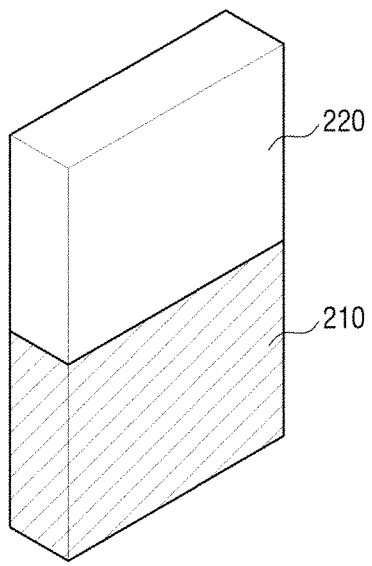

According to yet another exemplary embodiment, as shown in FIG. 3C, the emissive display 210 and the transparent display 220 may be disposed on the same layer. Here, the emissive display 210 and the transparent display 220 may have the same sizes, but this is only an exemplary embodiment. Therefore, the emissive display 210 and the transparent display 220 may be different sizes according to use purposes of the electronic apparatus 200.

Figure 3D:
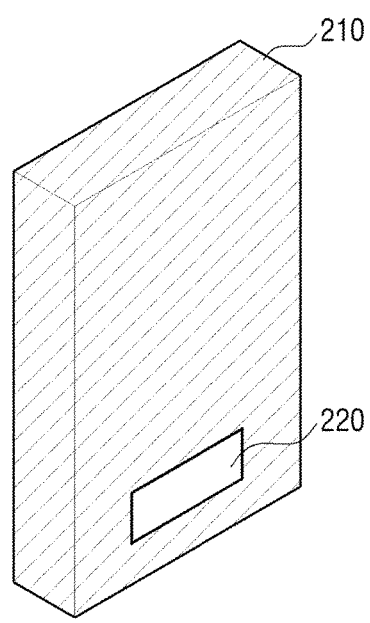

According to a further exemplary embodiment, as shown in FIG. 3D, the transparent display 220 may be disposed in an area of the emissive display 210.

Figure 4A:
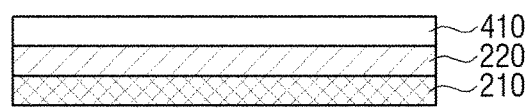
FIGS. 4A to 4E illustrate arrangements of an emissive display, a transparent display, and a touch panel according to various exemplary embodiments.
Figure 4B:
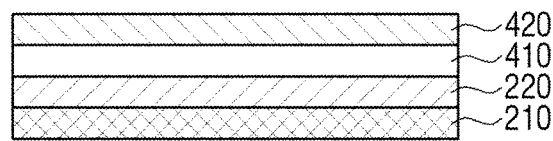
Figure 4C:
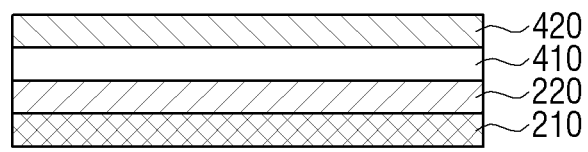
Figure 4D:
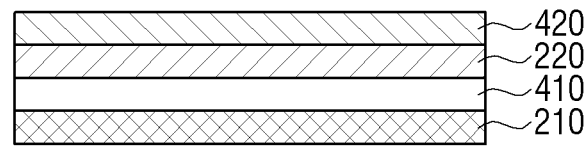
Figure 4E:
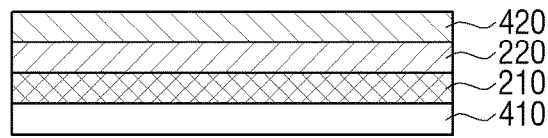

In still further exemplary embodiments, the emissive display 210 and the transparent display 220 may be combined with a touch panel 410 to be realized as a touch screen having a layer structure. In detail, as shown in FIG. 4A, the touch panel 410 may be disposed on the transparent display 220. Also, as shown in FIG. 4B, a reinforced glass 420 may be disposed on the touch panel 410 to protect a touch screen. In addition, the touch panel 410 may be disposed in various areas to control a touch sensitivity. As shown in FIG. 4C, if the touch panel 410 is disposed on the transparent display 220, the touch sensitivity may be high. As shown in FIG. 4D, if the touch panel 410 is disposed between the transparent display 220 and the emissive display 210, the touch sensitivity may be average. As shown in FIG. 4E, if the touch panel 410 is disposed on a lower surface of the emissive display 210, the touch sensitivity may be lowest.

The emissive display 210 and the transparent display 220 may be driven by the same drive controller, but this is only an exemplary embodiment. The emissive display 210 and the transparent display 220 may include respective drive controllers. Also, the emissive display 210 and the transparent display 220 may include respective logical or physical graphic memories.

Referring again to FIG. 2, the image receiver 230 may receive image data through various sources. For example, the image receiver 230 may receive broadcast data from an external broadcasting station, may receive Video On Demand (VOD) data from an external server in real time, and may receive image data from an external apparatus.

The image processor 240 may be an element that performs processing with respect to the image data received from the image receiver 230. The image processor 230 may perform various types of image processing, such as decoding, scaling, noise filtering, frame rate converting, resolution converting, etc., with respect to the image data. The image processor 240 may output a processed image to at least one selected from the emissive display 210 and the transparent display 220 according to a display mode.

The storage unit 250 may store various types of modules for driving the electronic apparatus 200. For example, the storage unit 250 may store software including a base module, a sensing module, a communication module, a presentation module, a web browser module, and a service module. Here, the base module is a base module that processes signals transmitted from pieces of hardware of the electronic apparatus 200 and transmits the processed signals to an upper layer module. The sensing module is a module that collects information from various types of sensors, and analyzes and manages the collected information and may include a face recognition module, a voice recognition module, a motion recognition module, a near field communication (NFC) recognition module, etc. The presentation module is a module that configures a display screen and may include a multimedia module for playing and outputting a multimedia content and a user interface (UI) rendering module for processing a UI and a graphic. The communication module is a module for performing communications with an external source. The web browser module is a module that performs web browsing to access a web server. The service module is a module that includes various types of applications for providing various types of services.

As described above, the storage unit 250 may include various types of program modules, and some of the various types of program modules may be omitted, modified, or added according to a type and a characteristic of the electronic apparatus 200. For example, if the electronic apparatus 200 is a tablet PC, the base module may further include a position determining module for determining a global positioning system (GPS)-based position, and the sensing module may further include a sensing module for sensing a motion of a user.

The storage unit 250 may also include a first memory that stores an image to be output to the emissive display 210 and a second memory that stores an image to be output to the transparent display 220. Here, the first memory and the second memory may be physically classified, but this is only an exemplary embodiment. Therefore, the first and second memories may be logically classified.

In an exemplary embodiment, the storage unit 250 may include a memory card (e.g., a micro secure digital (SD) card, a memory stick, or the like) to be defined. Here, the memory card may be installed in a read only memory (ROM) 282 or a random access memory (RAM) 281 of the controller 280 or in the electronic apparatus 200.

The communicator 260 may be an element that communicates with various types of external apparatuses according to various types of communication methods. The communicator 260 may include various types of communication chips such as a WiFi chip, a Bluetooth chip, an NFC chip, a wireless communication chip, etc. Here, the WiFi chip, the Bluetooth chip, and the NFC chip may respectively perform communications according to a WiFi method, a Bluetooth method, and an NFC method. Among these chips, the NFC chip may refer to a chip that operates according to an NFC method using a band of 13.56 MHz of various types of radio frequency identification (RFID) frequency bands such as 135 kHz, 13.56 MHz, 433 MHz, 860~960 MHz, 2.45 GHz, etc. If the WiFi chip or the Bluetooth chip is used, the communicator 260 may transmit and receive various types of connection information such as a subsystem identification (SSID), a session key, etc. to perform a communication connection by using the various types of connection information and then transmit and receive various types of information. The wireless communication chip refers to a chip that performs communications according to various types of communication standards such as IEEE, Zigbee, $3^{rd}$ Generation (3G), $3^{rd}$ Generation Partnership Project (3GPP), Long Term Evolution (LTE), etc.

The sensor 270 may sense a surrounding environment of the electronic apparatus 200 and a user input. In particular, the sensor 270 may include an illuminance sensor 271 that senses a surrounding illuminance, a touch sensor 273 that senses a user touch input, and a proximity sensor 275 that senses an approach of the user.

However, this is only an exemplary embodiment, and thus the sensor 270 may include various types of sensors such as a GPS sensor that senses position information, a motion sensor (e.g., a gyro sensor, an acceleration sensor, or the like) that senses a motion of the electronic apparatus 200, a pressure sensor, a noise sensor, etc.

The controller 280 may control an overall operation of the electronic apparatus 200 by using various types of programs stored in the storage unit 240.

As shown in FIG. 2, the controller 280 includes the RAM 281, the ROM 282, a graphic processor 283, a main central processing unit (CPU) 284, first through $n^{th}$ interfaces 285-1 through 285-n, and a bus 286. Here, the RAM 281, the ROM 282, the graphic processor 283, the main CPU 284, the first through $n^{th}$ interfaces 285-1 through 285-n, etc. may be connected to one another through the bus 286.

The ROM 282 stores a command set, etc. for booting a system. If a turn-on command is input to supply power, the main CPU 284 copies an operating system (O/S) stored in the storage unit 250 into the RAM 281 and executes the O/S to boot the system according to a command stored in the ROM 282. If the booting of the system is completed, the main CPU 284 copies various types of application programs stored in the storage unit 250 into the RAM 281 and executes the application programs copied into the RAM 281 to perform various types of operations.

The graphic processor 283 may generate a screen including various types of objects, such as a pointer, an icon, an image, a text, etc., by using an operator and a renderer. The operator calculates attribute values, such as coordinate values at which objects will be respectively displayed, shapes, sizes, and colors of the objects, etc., according to a layout of a screen by using a control command received from an input unit. The renderer generates a screen having various layouts including the objects based on the attribute values calculated by the operator. The screen generated by the renderer is displayed in display areas of displays (the emissive display 210 and the transparent display 220).

The main CPU 284 accesses the storage unit 250 to perform the booting by using the O/S stored in the storage unit 250. The main CPU 284 performs various types of operations by using various types of programs, contents, data, etc. stored in the storage unit 250.

The first through $n^{th}$ interfaces 285-1 through 285-n may be connected to various types of elements described above. One of interfaces may be a network interface that is connected to an external apparatus through a network.

In particular, the controller 280 may operate a display mode of the electronic apparatus 200 in one of first through third modes. In detail, the controller 280 may operate in one of the first mode that provides a first image-quality image through the emissive display 210, the second mode that provides a second image-quality image through the transparent display 220, and the third mode that provides an image by using both of the emissive display 210 and the transparent display 220.

Hereinafter, an exemplary embodiment that provides one of first through third modes according to a type of the electronic apparatus 200 will be described with reference to FIGS. 5A through 19D. FIGS. 5A through 7B illustrate a first mode and a second mode of a smart watch according to various exemplary embodiments.

If, for example, the electronic apparatus 200 is a smart watch, the controller 280 may operate in the second mode when there is no user input. If a user touch input is sensed, the controller 280 may operate the electronic apparatus 200 in the first mode.

Figure 5A:
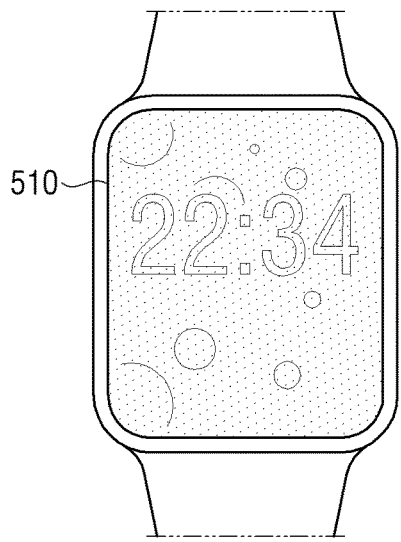
FIGS. 5A to 5B illustrate a first mode and a second mode of a smart watch according to an exemplary embodiment.
Figure 5B:

In detail, if a normal time information image 510 is provided without a user input, the controller 280 may operate in the second mode to control the transparent display 220 to display the normal time information image 510 as shown in FIG. 5A. If a user input is sensed when the normal time information image 510 is provided through the transparent display 220, the controller 280 may operate in the first mode to control the emissive display 210 to display a screen 520 corresponding to the user input.

In other words, if the electronic apparatus 200 is a smart watch, and the normal time information image 510 is provided, the normal time information image 510 may be provided by using the transparent display 220 having a low power consumption and a high outside visibility, and then, when a user input is sensed, the screen 520 corresponding to the user input may be provided by using the emissive display 210 providing a high-quality image. Therefore, a use time of a smart watch having a low battery capacity may be further increased.

The controller 280 may also acquire a surrounding illuminance value through the illuminance sensor 271. The controller 280 may also operate the display mode in one of the first and second modes based on the acquired illuminance value. In detail, if the acquired illuminance value is lower than or equal to a preset value, the controller 280 may operate the display mode in the first mode to control the emissive display 210 to provide a first image-quality image. If the acquired illuminance value exceeds the preset value, the controller 280 may operate the display mode in the second mode to control the transparent display 220 in order to provide the second image-quality image. In other words, if a surrounding environment is bright, an image may be provided by using the transparent display 220 having a high outside visibility. If the surrounding environment is dark, an image may be provided by using the emissive display 210 providing a high-quality image.

Figure 6A:
FIGS. 6A to 6B illustrate a first mode and a second mode of a smart watch according to an exemplary embodiment.
Figure 6B:
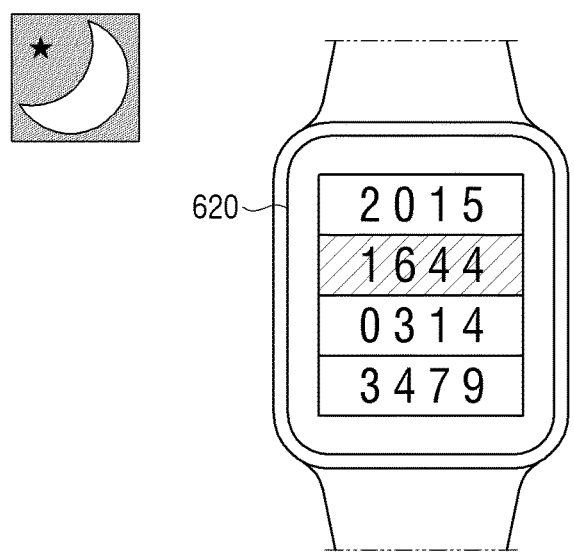

As described above, the controller 280 may determine the display mode by using the illuminance value acquired by the illuminance sensor 271, but this is only an exemplary embodiment. Therefore, the controller 280 may determine the display mode by using time information. In detail, as shown in FIG. 6A, if a current time is, for example, during daytime, the controller 280 may operate in the second mode to control the transparent display 220 to provide the second image-quality image, for example screen 610. Also, as shown in FIG. 6B, if the current time is a nighttime, the controller 280 may operate in the first mode to control the emissive display 210 to provide the first image-quality image, for example screen 620.

According to another exemplary embodiment, the controller 280 may determine the display mode by using schedule information. For example, if it is determined that an outdoor activity is performed during daytime, through the schedule information, the controller 280 may operate in the second mode to control the transparent display 220 to provide the second image-quality image. Also, if it is determined that an indoor activity is performed for the daytime, through the schedule information, the controller 280 may operate in the first mode to control the emissive display 210 to provide the first image-quality image.

According to another exemplary embodiment, the controller 280 may determine the display mode through weather information received through the communication 260. For example, during daytime of a day with fine weather, the controller 280 may operate in the second mode to control the transparent display 220 to provide the second image-quality image. Also, on a cloudy day or a rainy day, the controller 280 may operate in the first mode to control the emissive display 210 to provide the first image-quality image.

Also, the controller 280 may determine the display mode according to a type of a currently executed application. As shown for example in FIG. 7A, if an application (e.g., a memo application, a character application, a schedule application, or the like) that provides a text-centered static image is executed, the controller 280 may operate in the second mode to control the transparent display 220 to provide an execution screen, for example screen 710, of a second image-quality application. In other words, an image that does not need to have a high quality may be provided by using the transparent display 220 to reduce a power consumption, improve an outside readability, and reduce a sight fatigue of the user.

Figure 7A:
FIGS. 7A to 7B illustrate a first mode and a second mode of a smart watch according to an exemplary embodiment.
Figure 7B:
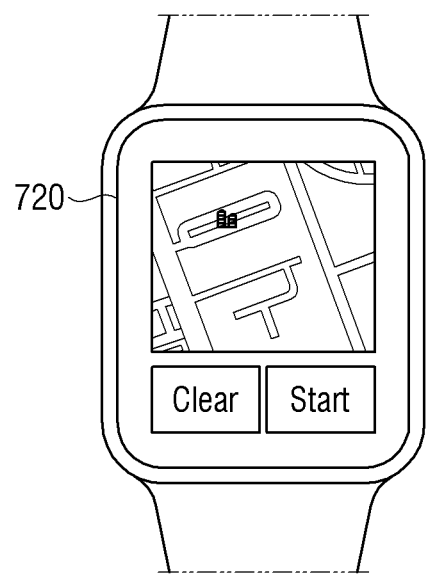
Figure 8A:
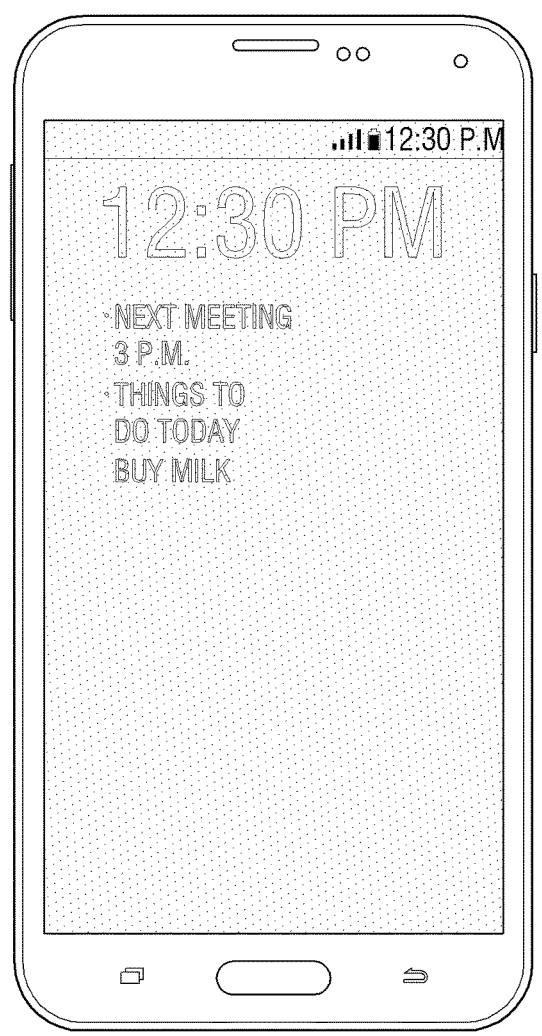
FIGS. 8A to 8B illustrate a first mode and a second mode of a smart watch according to an exemplary embodiment.
Figure 8B:
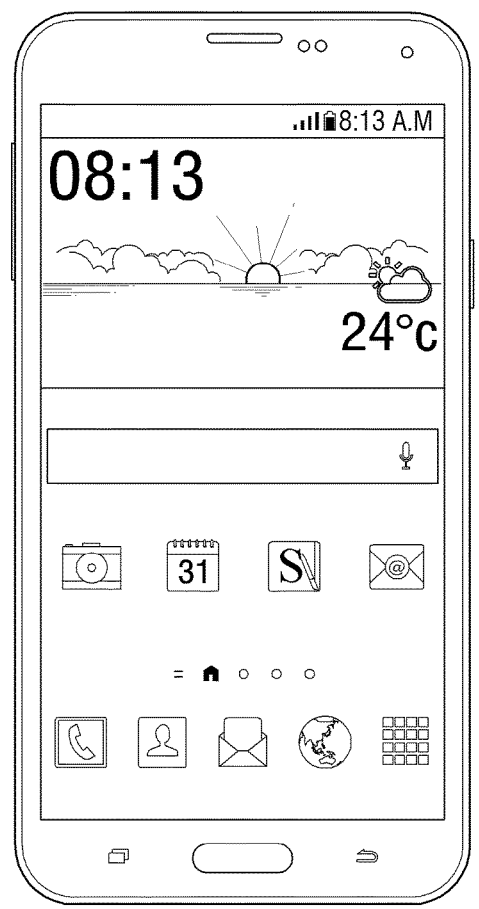

However, as shown in FIG. 7B, if an application (e.g., a video application, a map application, a gallery application, a news application, or the like) that provides a high-quality image or a video-centered image is executed, the controller 280 may operate in the first mode to control the emissive display 210 to provide an execution screen, for example screen 720, of a first image-quality application.

As described above, if the electronic apparatus 200 is a smart watch, the electronic apparatus 200 may operate in different display modes according to a user input, a surrounding environment, and a type of an application to further increase a use time of the smart watch having a small battery capacity.

FIGS. 8A through 10B illustrate a first mode and a second mode of a smartphone according to various exemplary embodiments.

The controller 280 may operate a display mode in a second mode for a standby mode and operate the display mode in a first mode for a normal mode. In detail, if the electronic apparatus 200 is in the standby mode, the controller 280 may operate in the second mode to provide a standby screen including time information, schedule information, etc. through the transparent display 220 as shown for example in FIG. 8A. Also, if an unlock interaction of a user is input for the standby mode to change the standby mode into a normal mode, the controller 280 may operate in the first mode to provide a start screen include an application icon, a widget, etc. through the emissive display 210 as shown for example in FIG. 8B.

The controller 280 may also acquire a surrounding illuminance value through the illuminance sensor 271. Also, the controller 280 may operate the display mode in one of the first and second modes based on the acquired illuminance value. In detail, if the acquired illuminance value is lower than or equal to a preset value, the controller 280 may operate the display mode in the first mode to control the emissive display 210 to provide a first image-quality image. If the acquired illuminance value exceeds the preset value, the controller 280 may operate the display mode in the second mode to control the transparent display 220 to provide a second image-quality image.

Figure 9A:
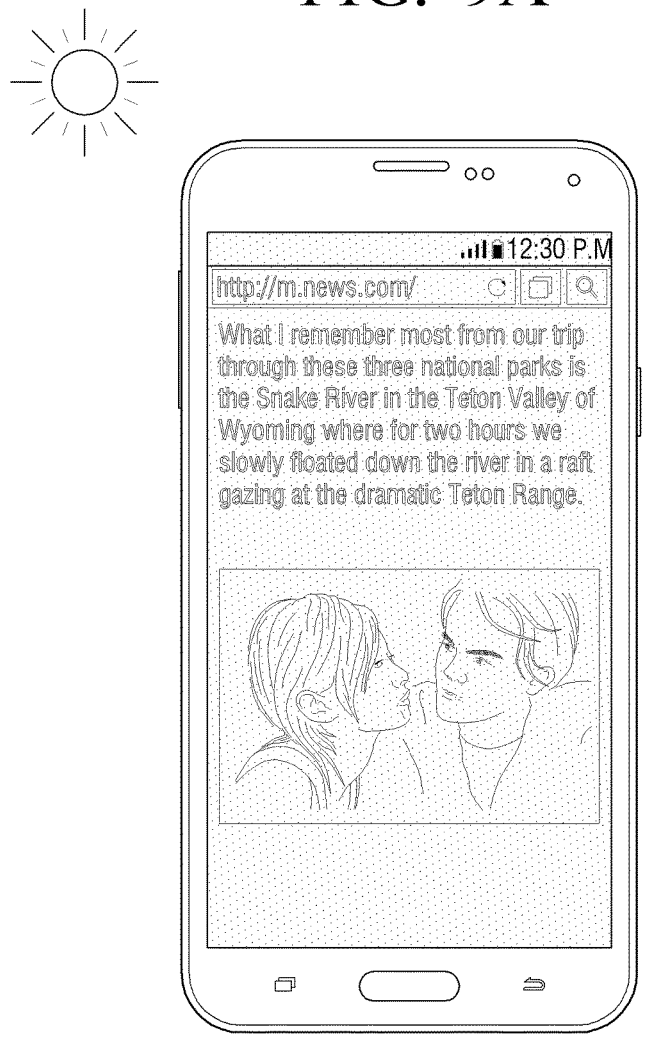
FIGS. 9A to 9B illustrate a first mode and a second mode of a smart watch according to an exemplary embodiment.
Figure 9B:
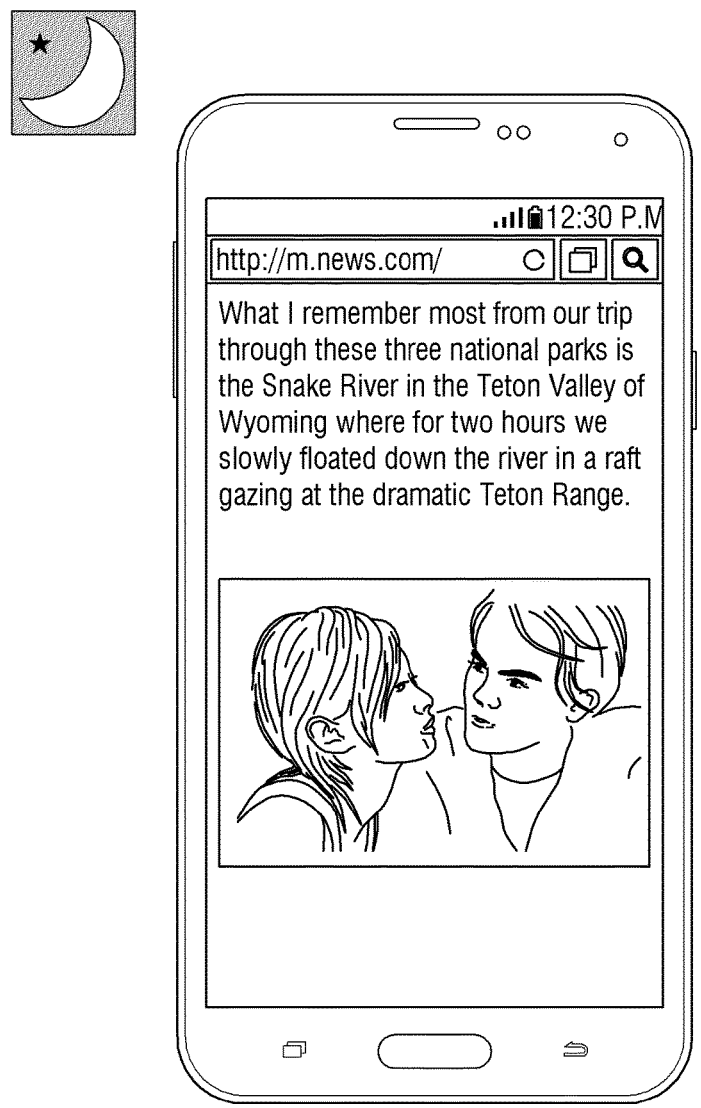

As shown in FIG. 9A, the controller 280 may operate in the second mode to control the transparent display 220 in order to provide the second image-quality image for a daytime. However, as shown in FIG. 9B, the controller 280 may operate in the first mode to control the emissive display 210 in order to provide the first image-quality image for a nighttime.

Also, if the electronic apparatus 200 is a smartphone, the controller 280 may determine the display mode by using various types of information such as schedule information, weather information, connected communication information, etc. like a smart watch.

Figure 10A:
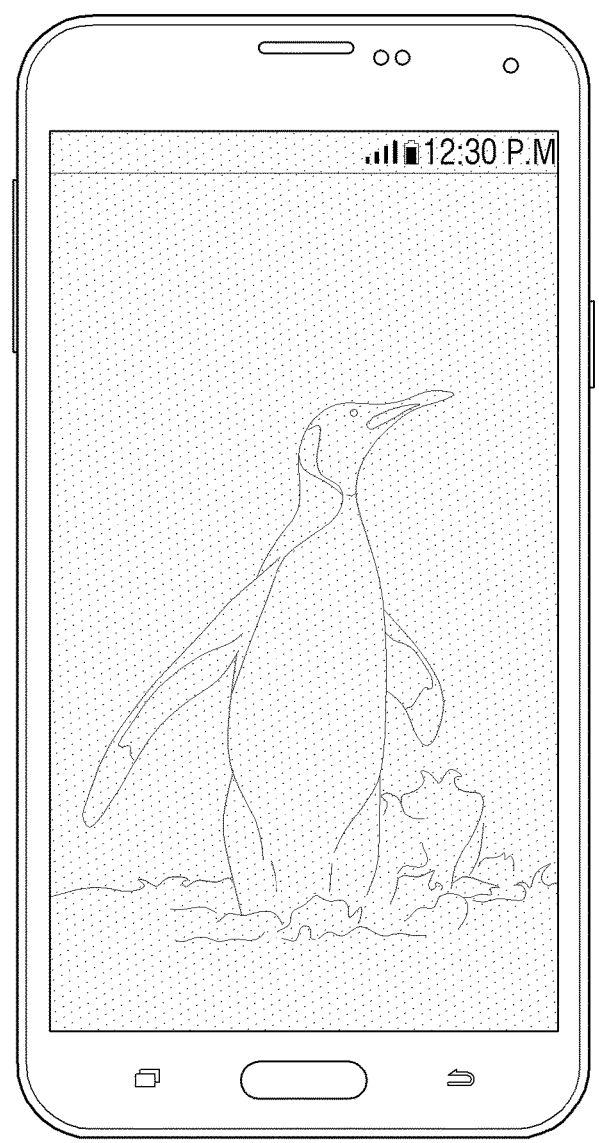
FIGS. 10A to 10B illustrate a first mode and a second mode of a smart watch according to an exemplary embodiment.
Figure 10B:
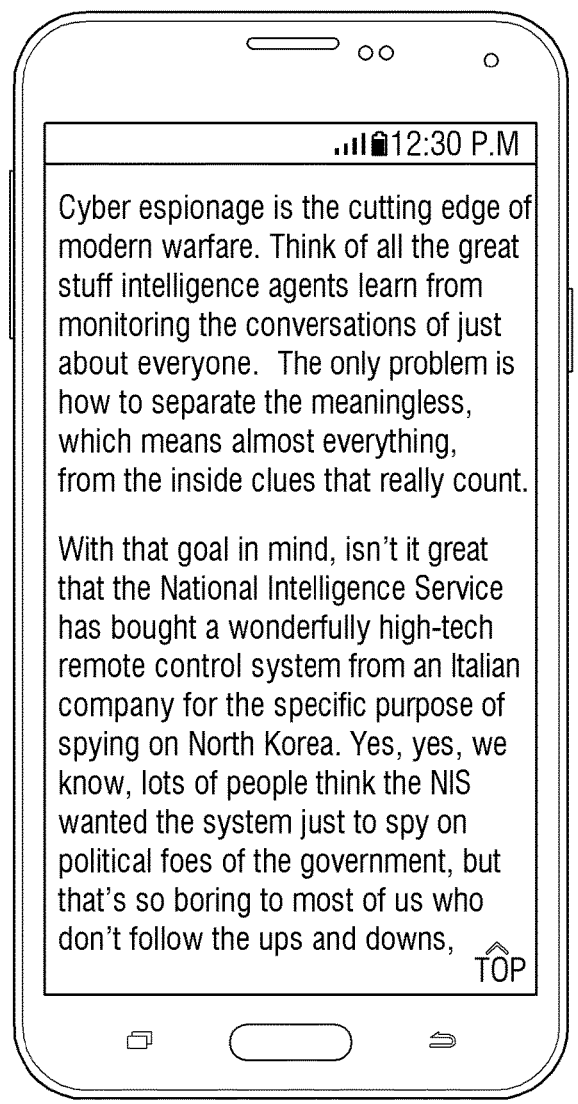
Figure 11A:
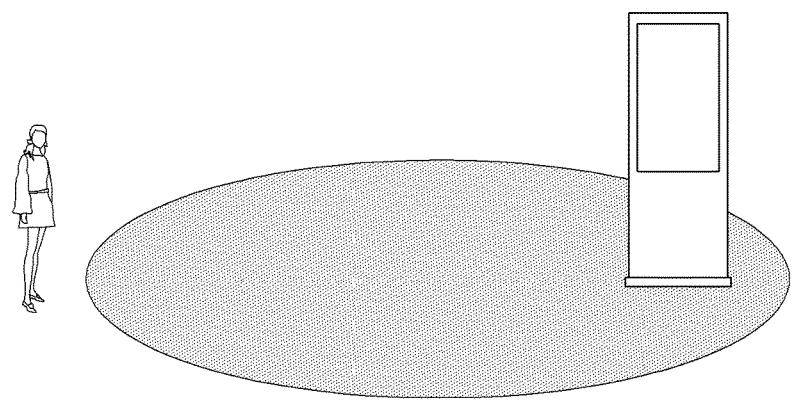
FIGS. 11A to 11B illustrate first through third modes of a signage according to an exemplary embodiment.
Figure 11B:
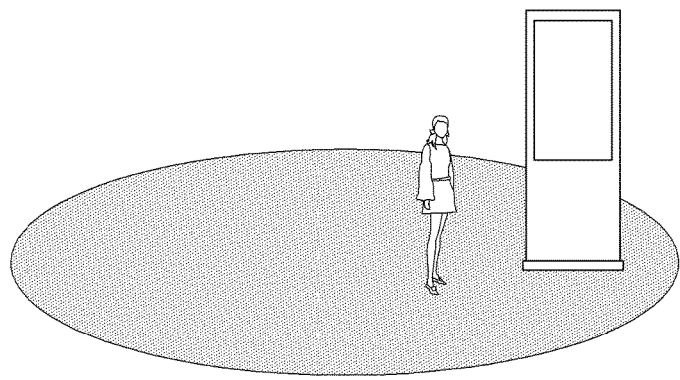
Figure 12A:
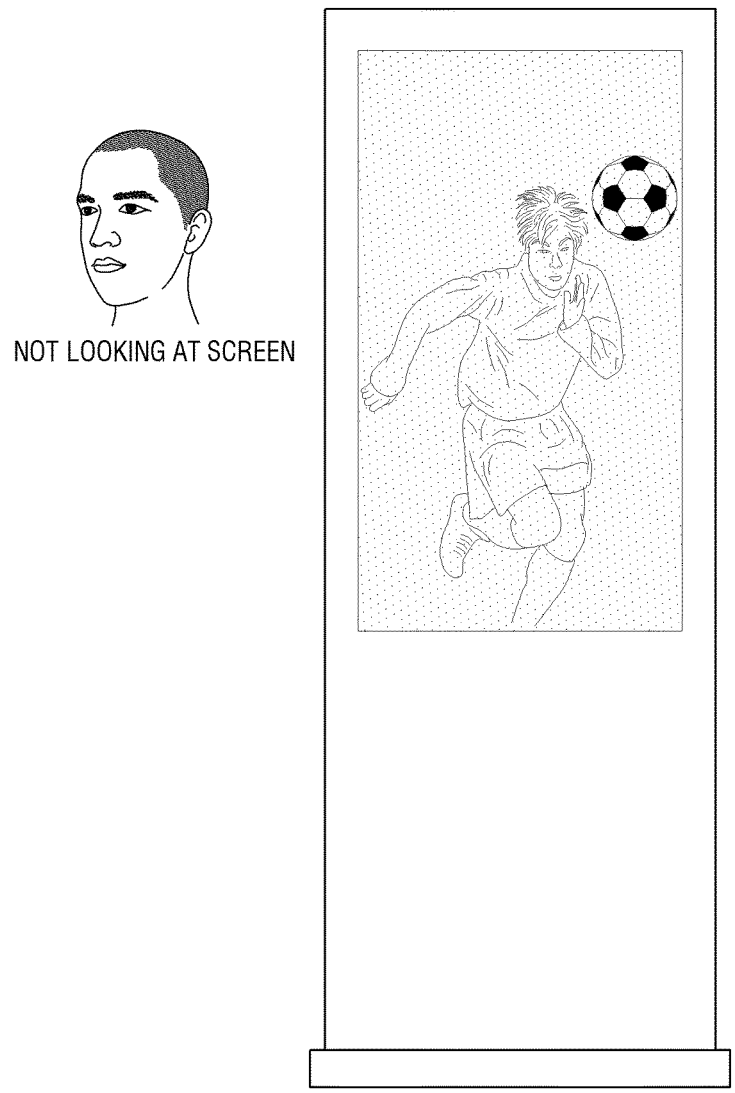
FIGS. 12A to 12B illustrate first through third modes of a signage according to an exemplary embodiment.
Figure 12B:
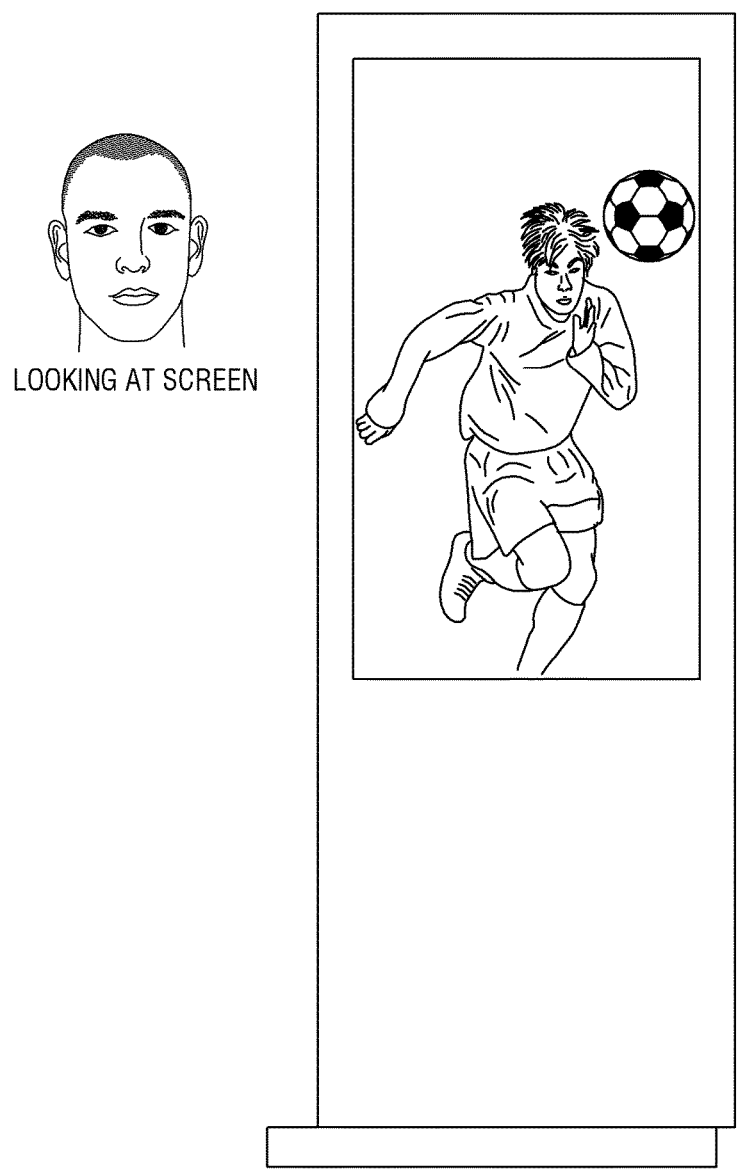
Figure 13A:
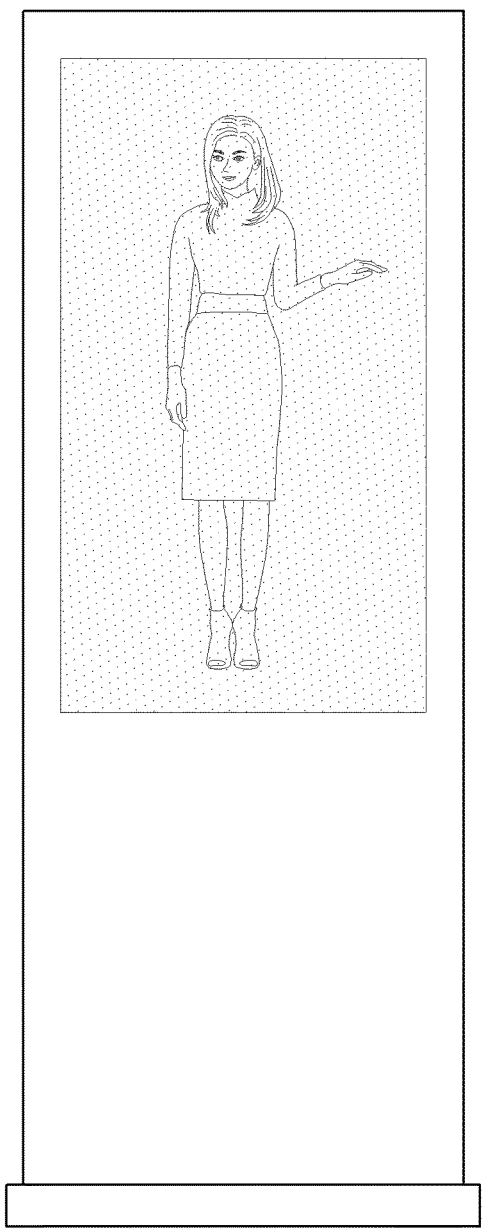
FIGS. 13A to 13B illustrate first through third modes of a signage according to an exemplary embodiment.
Figure 13B:
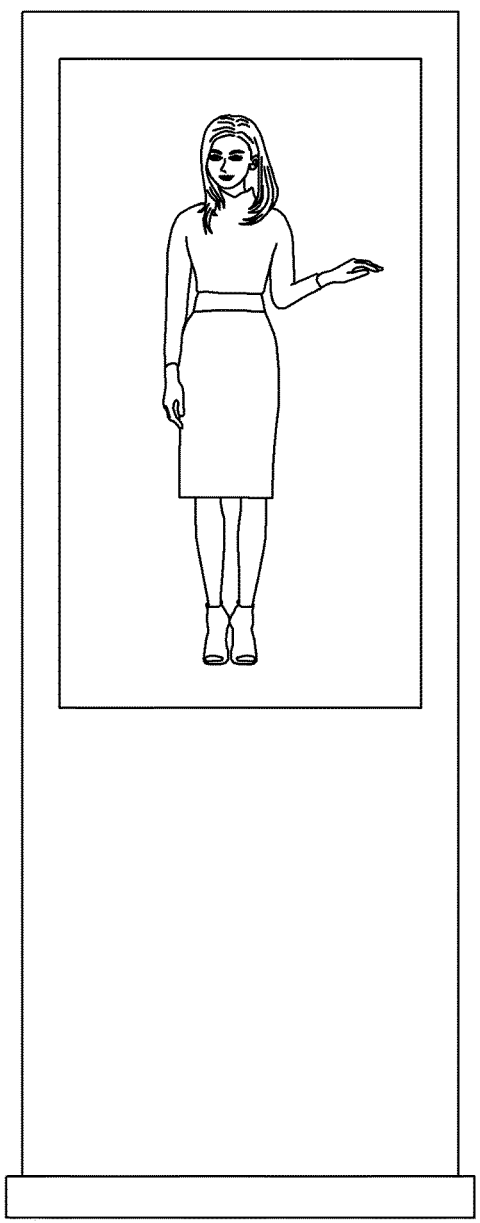
Figure 14A:
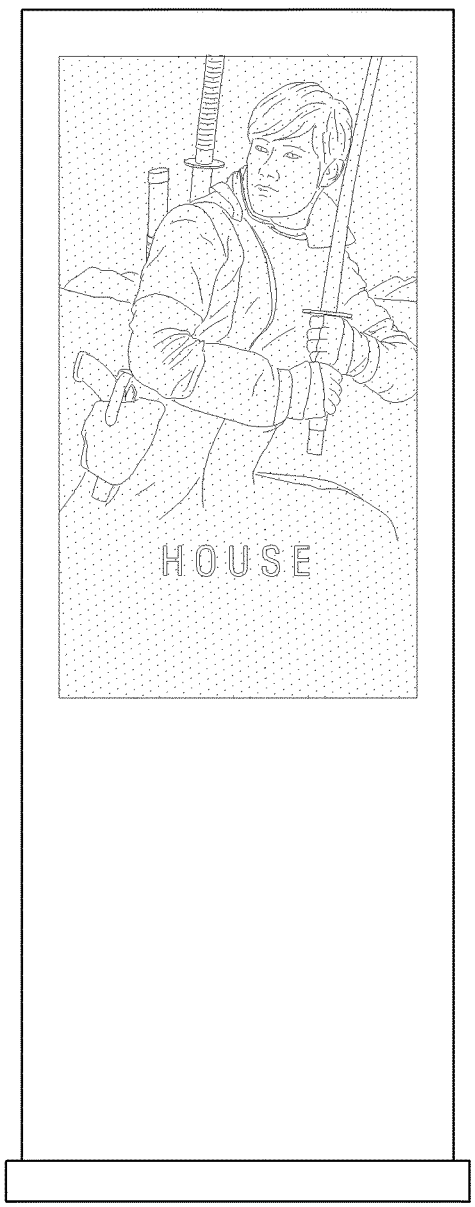
FIGS. 14A to 14B illustrate first through third modes of a signage according to an exemplary embodiment.
Figure 14B:
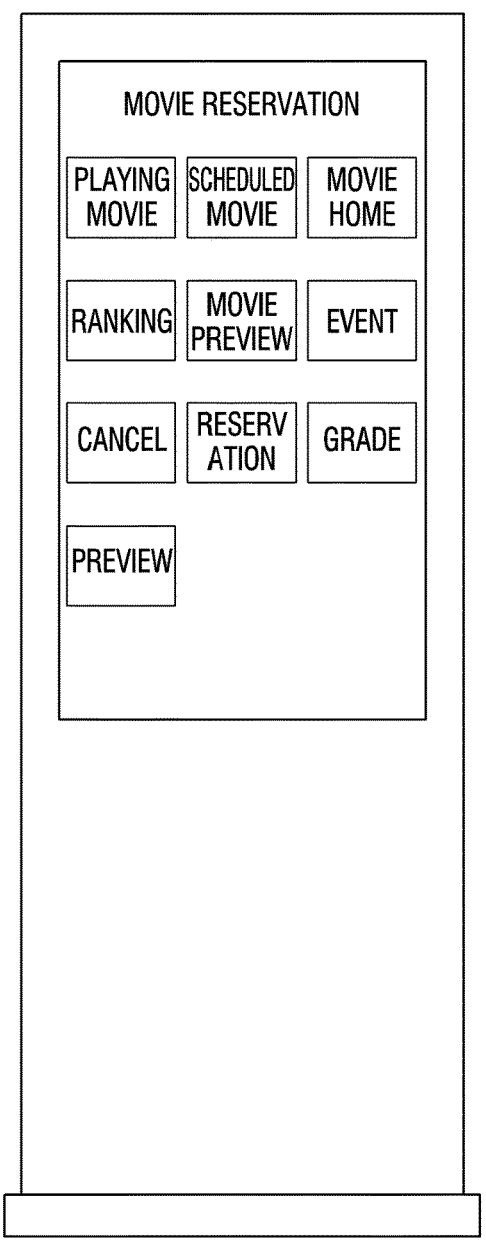

If the electronic apparatus 200 is the smartphone, the controller 280 may determine the display mode according to a type of a currently executed application. In detail, as shown in FIG. 10A, if an application (e.g., a video application, a map application, a gallery application, a news application, or the like) that provides a high-quality image or a video-centered image is executed, the controller 280 may operate in the first mode to control the emissive display 210 to provide an execution screen of a first image-quality application. However, as shown in FIG. 10B, if an application that provides a text-centered static image is executed, the controller 280 may operate in the second mode to control the transparent display 220 to provide an execution screen of a second image-quality application.

As described above, if the electronic apparatus 200 is the smartphone, the electronic apparatus 200 may operate in different display modes according to an operation mode of the electronic apparatus 200, a type of an executed application, and a surrounding environment in order to increase a use time of the smartphone and provide an optimum image according to a situation.

FIGS. 11A through 18 illustrate first through third modes of a signage according to various exemplary embodiments.

If the electronic apparatus 200 is a signage that is installed in an outdoor place to provide advertisement information, place information, purchasing information, or the like, the controller 280 may operate in different display modes according to whether a user approaches. In detail, as shown, for example, in FIG. 11A, if it is sensed that the user is beyond a preset distance, through the proximity sensor 275, the controller 280 may operate in the second mode to control the transparent display 220 to provide a second image-quality image. However, as shown, for example, in FIG. 11B, if it is sensed that the user is within the preset distance, through the proximity sensor 275, the controller 280 may operate in the first mode to control the emissive display 210 to provide a first image-quality image. Here, the preset distance may be set to a distance (for example, 1 m) where the user may contact the electronic apparatus 200.

Also, if the electronic apparatus 200 is a signage, the controller 280 may operate in different display modes according to whether the user looks at the electronic apparatus 200. In detail, as shown, for example, in FIG. 12A, if it is sensed that the user is not looking at the electronic apparatus 200, the controller 280 may operate in the second mode to control the transparent display 220 to provide a second image-quality image. However, as shown, for example, in FIG. 12B, if it is sensed that the user looks at the electronic apparatus 200, the controller 280 may operate in the first mode to control the emissive display 210 to provide a first image-quality image.

Also, if the electronic apparatus 200 is a signage, the controller 280 may operate in different display modes according to at least one selected from a resolution, color depth, a frame speed of an input image. In detail, if an image having a low resolution, a low color depth, or a low frame speed is input, the controller 280 may operate in the second mode to control the transparent display 220 to provide a second image-quality image as shown, for example, in FIG. 13A. However, if an image having a high resolution, a high color depth, a high frame speed is input, the controller 280 may operate in the first mode to control the emissive display 210 to provide a first image-quality image as shown, for example, in FIG. 13B.

Also, if the electronic apparatus 200 is a signage, the controller 280 may operate in different display modes according to whether a currently displayed image is an image into which a user input may be performed. In detail, if an input image is an image (e.g., a poster) upon which a user input may not be performed, the controller 280 may operate in the second mode to control the transparent display 220 to provide a second image-quality image as shown, for example, in FIG. 14A. However, if the input image is an image (e.g., a movie reservation screen) into which the user input may be performed, the controller 280 may operate in the first mode to control the emissive display 210 to provide a first image-quality image, as shown, for example, in FIG. 14B.

The controller 280 may operate in a third mode where at least a part of the emissive display 210 and at least a part of the transparent display 220 simultaneously operate.

Figure 15A:
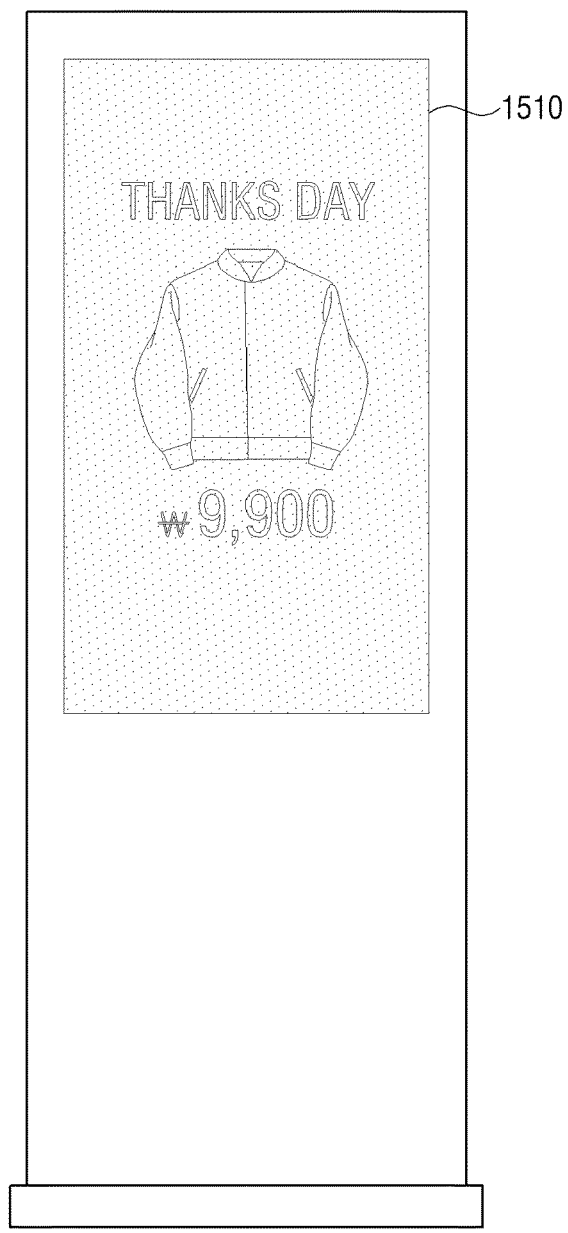
FIGS. 15A to 15B illustrate first through third modes of a signage according to an exemplary embodiment.
Figure 15B:
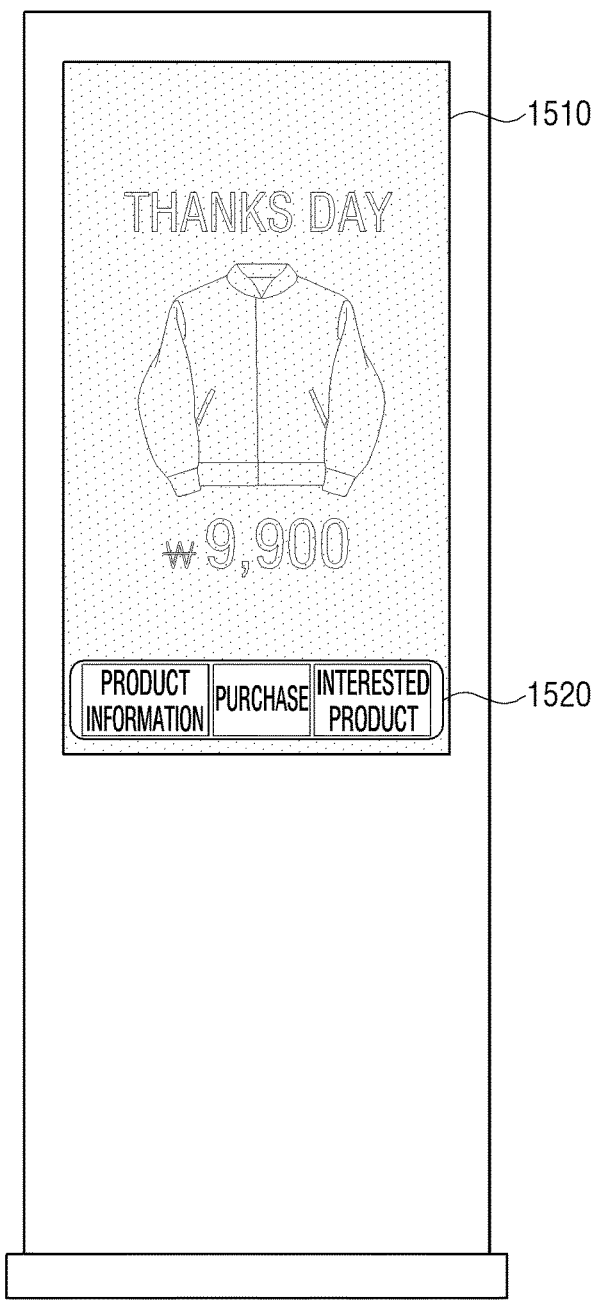

In detail, if the electronic apparatus 200 is a signage, and a currently displayed image is an information providing image 1510 providing information such as a product image, price information, or the like, the controller 280 may operate in the second mode to control the transparent display 220 to provide the information providing image 1510 as shown in FIG. 15A. However, the information providing image 1510 providing the information such as the product image, the price information, or the like and an interaction image 1520 sensing a user input are displayed together, the controller 280 may operate in the third mode to control the transparent display 220 to provide the information providing image 1510 and control the emissive display 210 to provide the interaction image 1520 as shown in FIG. 15B. In other words, one screen may be divided into two areas to provide an information providing image in one area by using the transparent display 220 and provide an interaction image in the other area by using the emissive display 210.

Figure 16A:
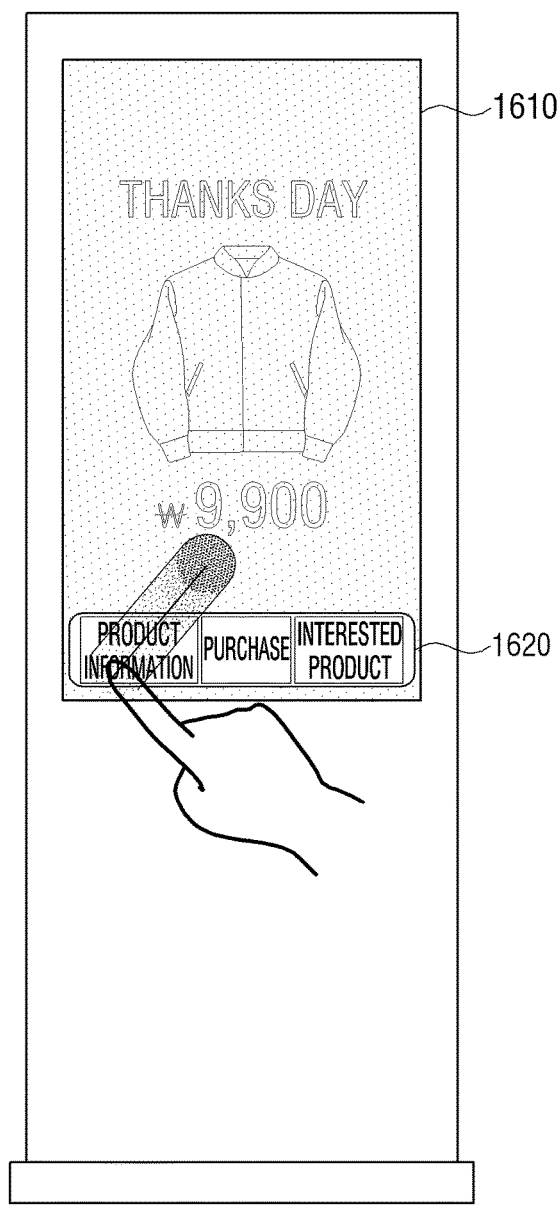
FIGS. 16A to 16B illustrate first through third modes of a signage according to an exemplary embodiment.
Figure 16B:
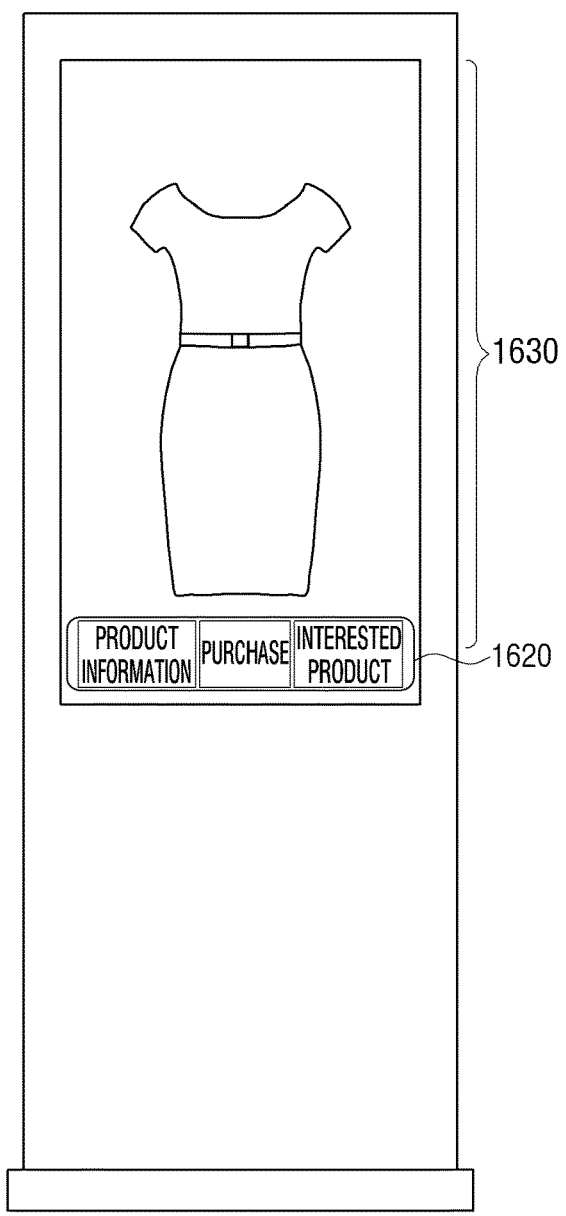

Also, as shown in FIG. 16A, if a user input, which is intended to touch a part of an interaction image 1620 to drag the interaction image 1620 into an area where an information providing image 1610 is displayed, is sensed when operating in a third mode, the controller 280 may operate in the first mode to control the emissive display 210 to provide the interaction image 1620 along with an image 1630 corresponding to a user interaction as shown in FIG. 16B.

Figure 17A:
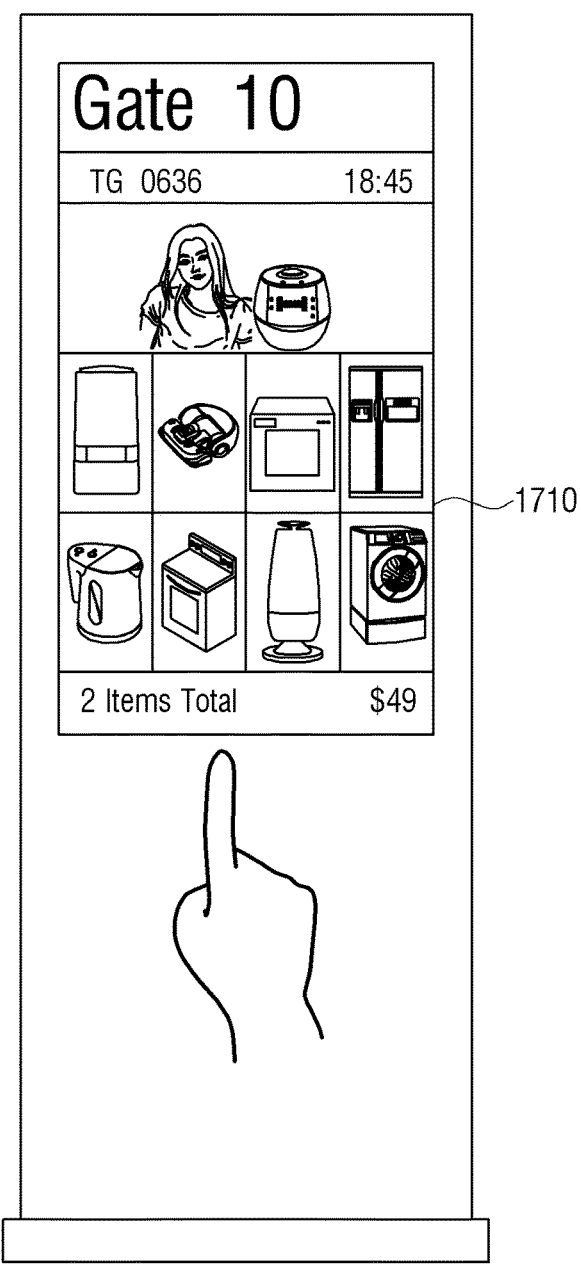
FIGS. 17A to 17B illustrate first through third modes of a signage according to an exemplary embodiment.
Figure 17B:
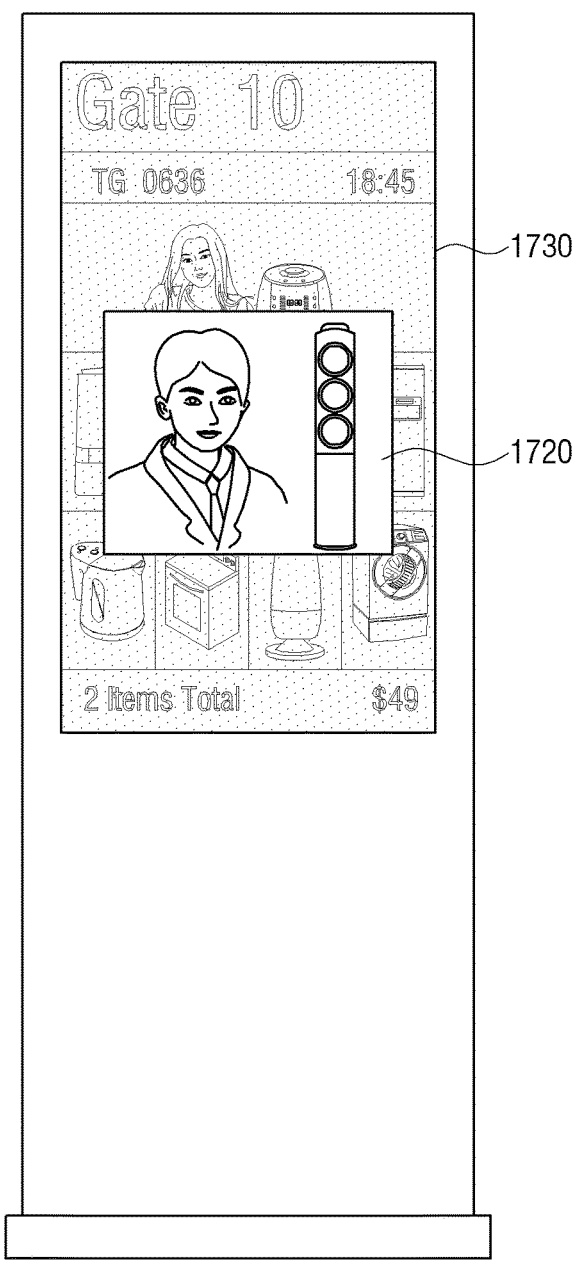

Also, the controller 280 may drive only a partial area of an input screen through the emissive display 210 and drive the other area through the transparent display 220. In detail, as shown in FIG. 17A, the controller 280 may operate in the first mode to control the emissive display 210 to provide an advertisement image 1710 about a plurality of products. Also, if a user input for selecting one of a plurality of products is sensed, the controller 280 may operate in the third mode to provide a video about a selected product through the emissive display 220 and provide an other area 1730 through the transparent display 220 as shown in FIG. 17B.

Figure 18:
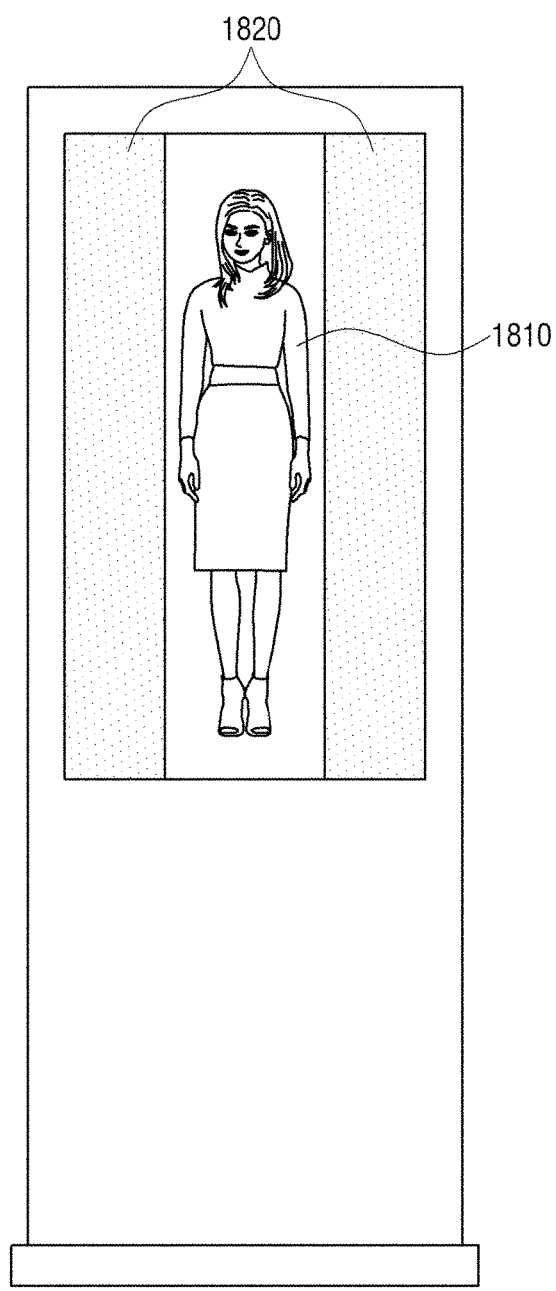
FIG. 18 illustrates first through third modes of a signage according to an exemplary embodiment.

The controller 280 may also analyze an input image to operate in the third mode. In detail, if an image as shown in FIG. 18 is input, the controller 280 may sense an area 1810

(for example, an area where an image of a person exists) requiring a high-quality image, provide the sensed area through the emissive display 210, and provide an area 1820 not requiring a high-quality image through the transparent display 220. Also, the controller 280 may detect an area parallel with eyes of the user from an input image, provide the detected area through the emissive display 210, and provide an other area through the transparent display 220.

As described above, if the electronic apparatus 200 is a signage, the electronic apparatus 200 may drive an area, into which a user interaction may be input or where a high-quality image is displayed, through the emissive display 210 and drive an area, which provides simple information or where a low-quality image is displayed, through the transparent display 220.

Figure 19A:
FIGS. 19A to 19D illustrate a first mode and a second mode of a TV according to various exemplary embodiments.
Figure 19B:
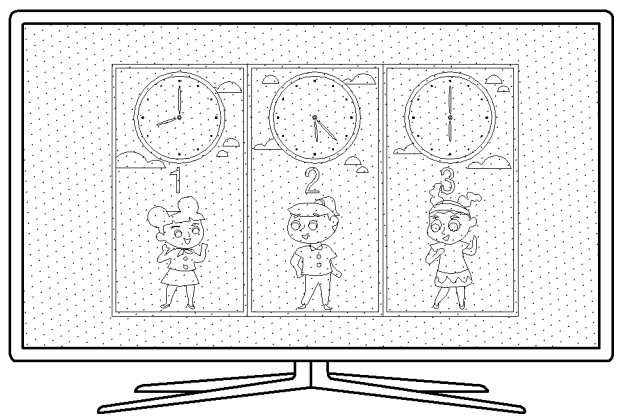
Figure 19C:
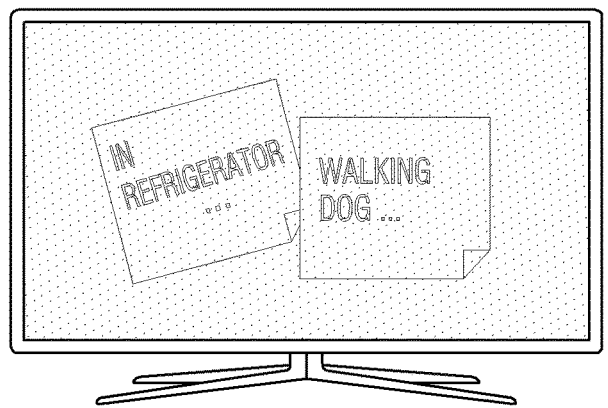
Figure 19D:
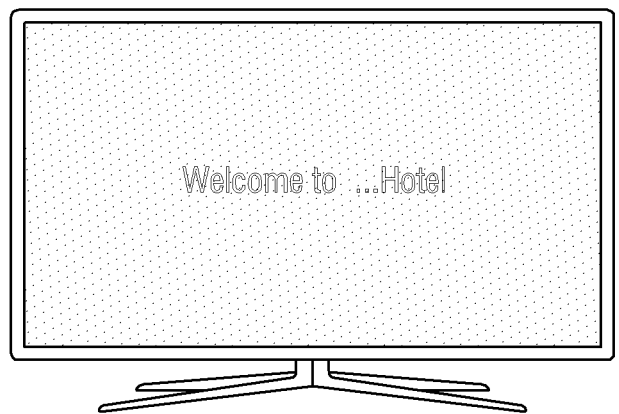

FIGS. 19A through 19C illustrate a first mode and a second mode of a TV according to various exemplary embodiments.

If the electronic apparatus 200 is realized as a TV, and a current drive mode of the electronic apparatus 200 is a standby mode (or a sleep mode), the controller 280 may operate a display mode in a second mode to provide an image through the transparent display 220.

According to an exemplary embodiment, when a current drive mode of the electronic apparatus 200 is a standby mode, the controller 280 may operate in the second mode to control the transparent display 220 to provide daily schedule information as shown, for example, in FIG. 19A. When the current drive mode of the electronic apparatus 200 is the standby mode, the controller 280 may operate in the second mode to control the transparent display 220 to provide a character message (e.g., a sleeping induction message, an etiquette message, a meal guide message, or the like) for getting children into lifelong habits as shown, for example, in FIG. 19B. When the current drive mode of the electronic apparatus 200 is the standby mode, the controller 280 may operate in the second mode to control the transparent display 220 to provide daily schedule information as shown, for example, in FIG. 19A. Also, when the current drive mode of the electronic apparatus 200 is the standby mode, the controller 280 may operate in the second mode to control the transparent display 220 to provide daily memo screens received from a plurality of users as shown, for example, in FIG. 19C. Also, when the current drive mode of the electronic apparatus 200 is the standby mode, the controller 280 may operate in the second mode to control the transparent display 220 to provide a hotel guide screen (that may include a quick menu although not shown in FIG. 19D) as shown, for example, in FIG. 19D.

As described above, various types of images may be provided through the transparent display 220 in a standby mode. Thereafter, if a turn-on command of the user is input, the controller 280 may change the display mode into the first mode to provide an image through the emissive display 210.

Figure 20:
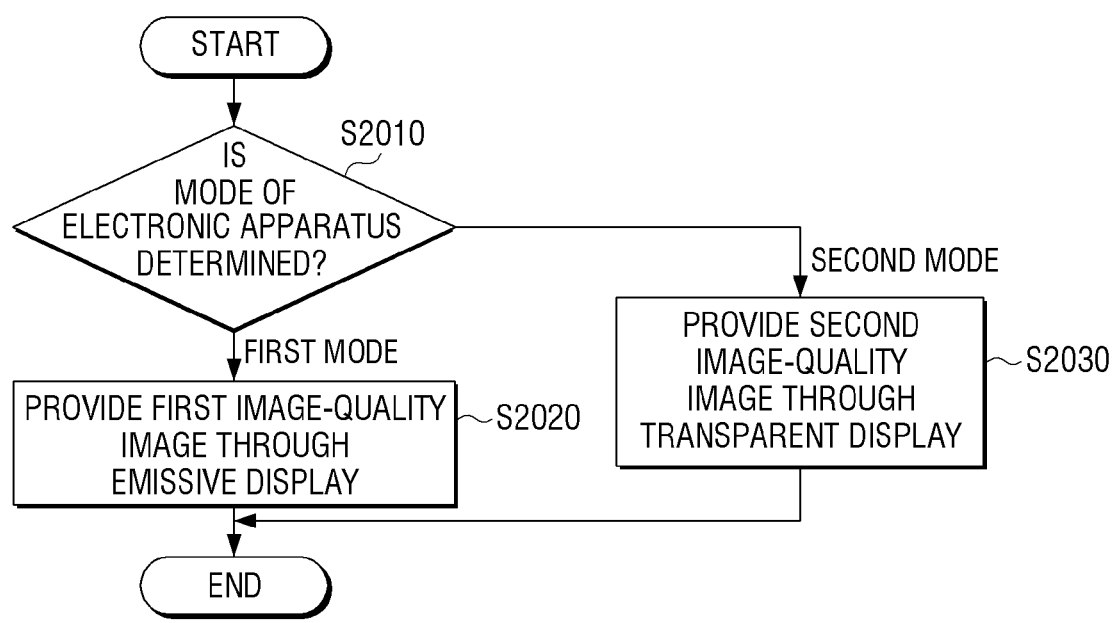
FIGS. 20 to 26 are flowcharts of methods of controlling an electronic apparatus according to various exemplary embodiments.

Hereinafter, a control method according to exemplary embodiments will be described with reference to FIGS. 20 through 26. FIG. 20 is a flowchart of a method of controlling the electronic apparatus 100 according to an exemplary embodiment.

In operation S2010, the electronic apparatus 100 determines a mode of the electronic apparatus 100. Here, the mode of the electronic apparatus 100 may include a first mode and a second mode and may be different according to a user input, a surrounding environment, and a type of a currently executed application.

If it is determined in operation S2010 that the mode of the electronic apparatus 100 is a first mode, the electronic apparatus 100 provides a first image-quality image through the emissive display 110 in operation S2020. If it is determined in operation S2010 that the mode of the electronic apparatus 100 is a second mode, the electronic apparatus 100 provides a second image-quality image through the transparent display 120 in operation S2030. Here, the first image quality may be, for example, a higher image quality than the second image quality. In addition, a first image-quality image may refer to, for example, a first image having a first image quality, and a second image-quality image may refer to, for example, a second image having a second image quality.

Figure 21:
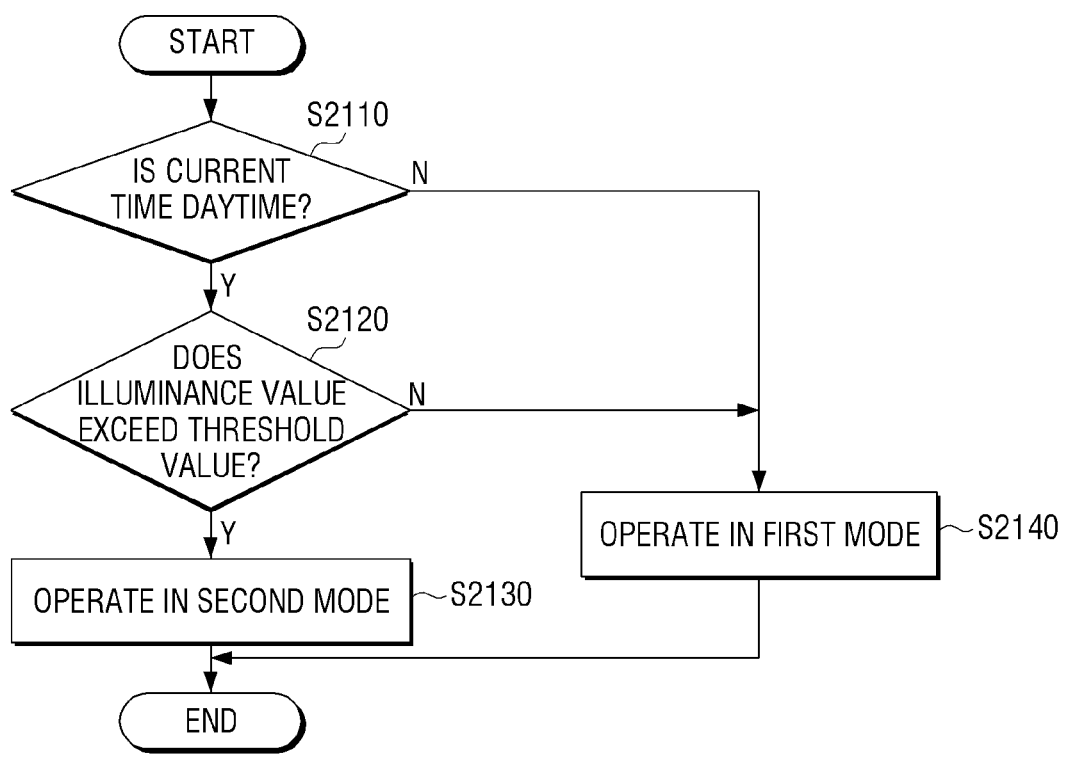

FIG. 21 is a flowchart of a method of determining a display mode according to a surrounding brightness through the electronic apparatus 100 according to an exemplary embodiment. Here, the electronic apparatus 100 may be a smart watch or a smartphone.

In operation S2110, the electronic apparatus 100 determines whether a current time is during daytime.

If it is determined in operation S2110 that the current time is during daytime, the electronic apparatus 100 determines whether a currently measured illuminance value exceeds a threshold value in operation S2120. If it is determined in operation S2120 that the currently measured illuminance value exceeds the threshold value, the electronic apparatus 100 operates a display mode in a second mode in operation S2130. In other words, the electronic apparatus 100 may operate in the second mode to provide an image through the transparent display 120 having a high outside visibility.

However, if it is determined in operation S2110 that the current time is a nighttime or it is determined in operation S2120 that the currently measured illuminance value is lower than or equal to the threshold value, the electronic apparatus 100 operates the display mode in a first mode in operation S2140. In other words, the electronic apparatus 100 may operate in the first mode to provide an image through the emissive display 110 that may provide a high-quality image.

Figure 22:
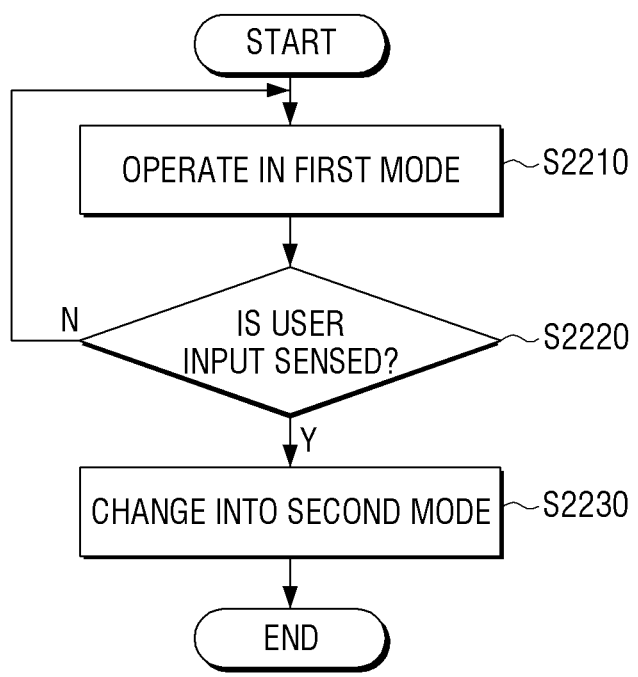

FIG. 22 is a flowchart of a method of changing a display mode according to a user touch through the electronic apparatus 100 according to an exemplary embodiment.

In operation S2210, the electronic apparatus 100 operates in a first mode. Here, if the electronic apparatus 100 is a smart watch, the electronic apparatus 100 may operate in the first mode when providing a time information providing screen. If the electronic apparatus 100 is a smartphone, the electronic apparatus 100 may operate in the first mode when providing a standby screen.

In operation S2220, the electronic apparatus 100 determines whether a user input is sensed. Here, if the electronic apparatus 100 is a smart watch, the user input may, for example, be a touch input. If the electronic apparatus 100 is a smartphone, the user input may, for example, be an unlock interaction.

If it is determined in operation S2220 that the user input is sensed, the electronic apparatus 100 changes the display mode into a second mode in operation S2230. In other words, if the user input is sensed, the electronic apparatus 100 may operate in the second mode to provide a high-quality image through the emissive display 110.

Figure 23:
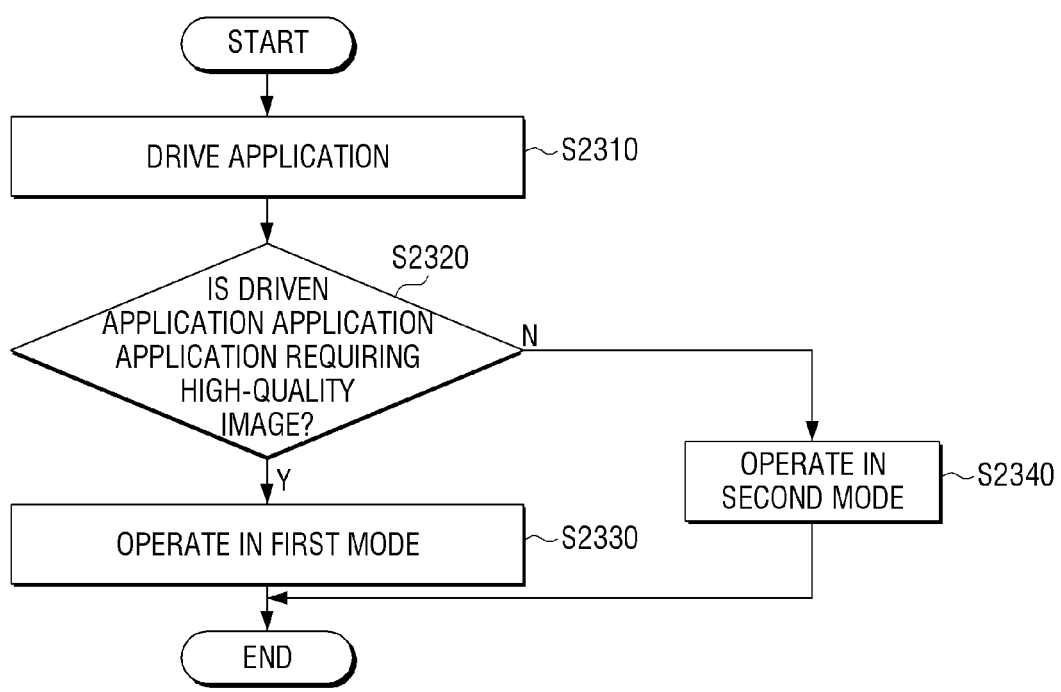

FIG. 23 is a flowchart of a method of determining a display mode according to a type of an application through the electronic apparatus 100 according to an exemplary embodiment.

In operation S2310, the electronic apparatus 100 drives an application.

In operation S2320, the electronic apparatus 100 determines whether the driven application is an application requiring a high-quality image. In detail, the electronic apparatus 100 may determine an application (e.g., a video application, a map application, a gallery application, or the like), which provides a high-quality image and a high-quality video, as an application requiring a high quality and determine an application (e.g., a character application, a memo application, or the like), which mainly provides text, as an application not requiring a high quality.

If it is determined in operation S2320 that the currently driven application is an application requiring a high-quality image, the electronic apparatus 100 operates in a first mode in operation S2330. In other words, the electronic apparatus 100 may operate in the first mode to provide a first image-quality image through the emissive display 110.

However, if it is determined in operation S2320 that the currently driven application is not an application requiring a high-quality image, the electronic apparatus 100 operates in a second mode in operation S2340. In other words, the electronic apparatus 100 may operate in the second mode to provide a second image-quality image through the transparent display 120.

Figure 24:
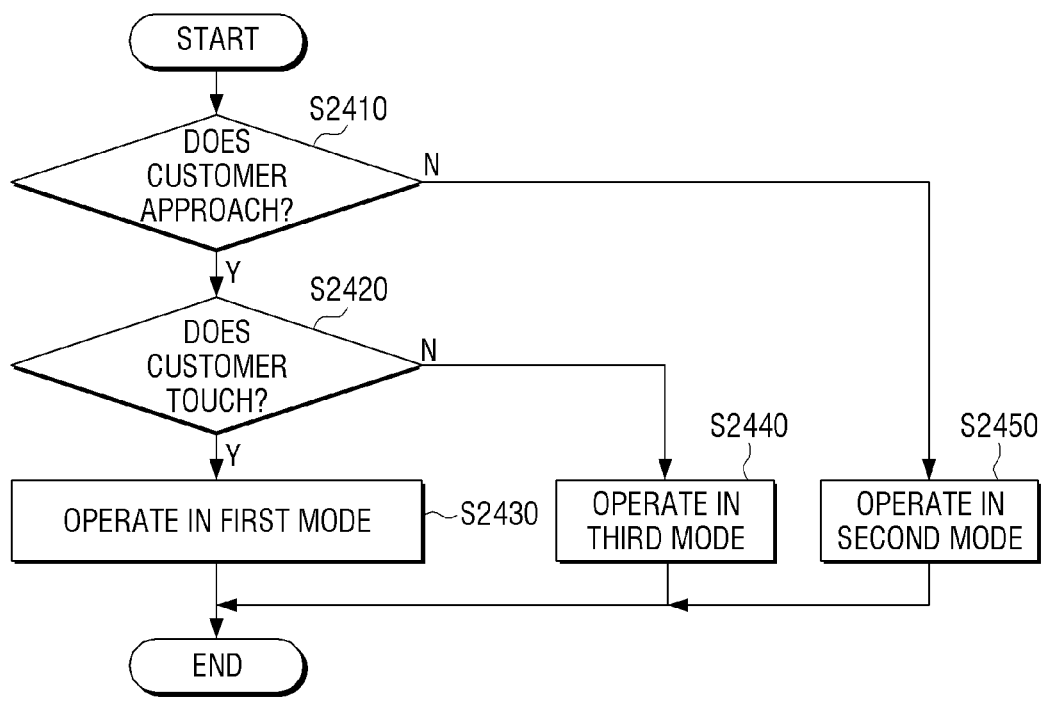

FIG. 24 is a flowchart of a method of determining a display mode if the electronic apparatus 100 is a signage, according to an exemplary embodiment.

In operation S2410, the electronic apparatus 100 determines whether a customer approaches.

If it is determined in operation S2410 that the customer is not approaching, the electronic apparatus 100 operates in a second mode to provide an image through the transparent display 120 in operation S2450.

If it is determined in operation S2410 that the customer approaches, the electronic apparatus 100 determines whether the customer touches the electronic apparatus 100 in operation S2420.

If it is determined in operation S2420 that the customer touches the electronic apparatus 100, the electronic apparatus 100 operates in a first mode to provide an image through the emissive display 110 in operation S2430.

However, if it is determined in operation S2420 that the customer does not touch the electronic apparatus 100, the electronic apparatus 100 operates in a third mode to provide an image in a partial area (e.g., an area where a touch input may be performed) through the emissive display 110 and provide an image in an other area through the transparent display 120 in operation S2440.

Figure 25:
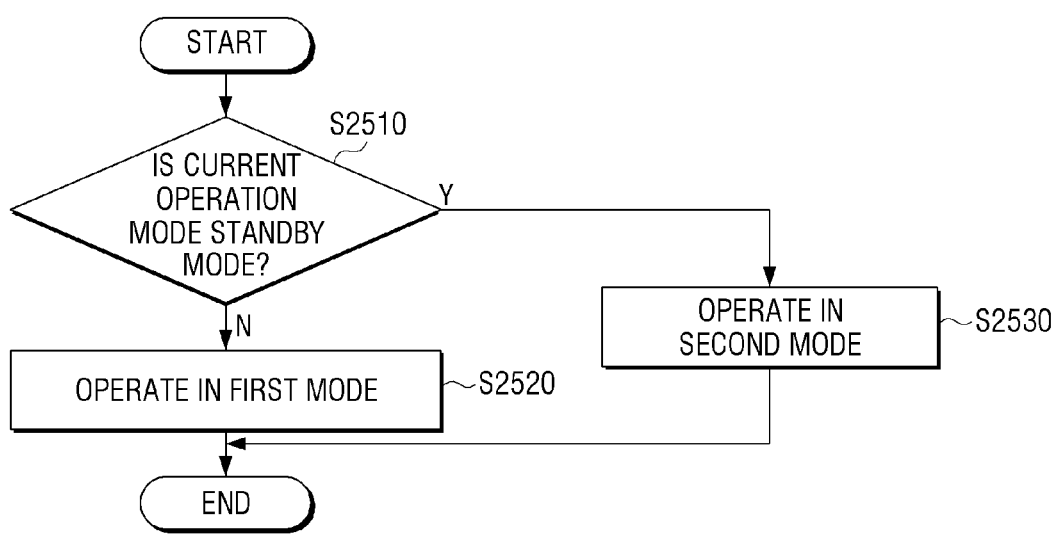

FIG. 25 is a flowchart of a method of determining a display mode if the electronic apparatus 100 is a TV, according to an exemplary embodiment.

In operation S2510, the electronic apparatus 100 determines whether a current operation mode is a standby mode. Here, the standby mode may be a mode where an input of a turn-on command stands by when a socket is plugged in.

If it is determined in operation S2510 that the current operation mode is the standby mode, the electronic apparatus 100 operates a display mode in a second mode to provide an image through the transparent display 120 in operation S2530. If it is determined in operation S2510 that the current operation mode is not the standby mode, the electronic apparatus 100 operates the display mode in a first mode to provide an image through the emissive display 110 in operation S2520.

Figure 26:
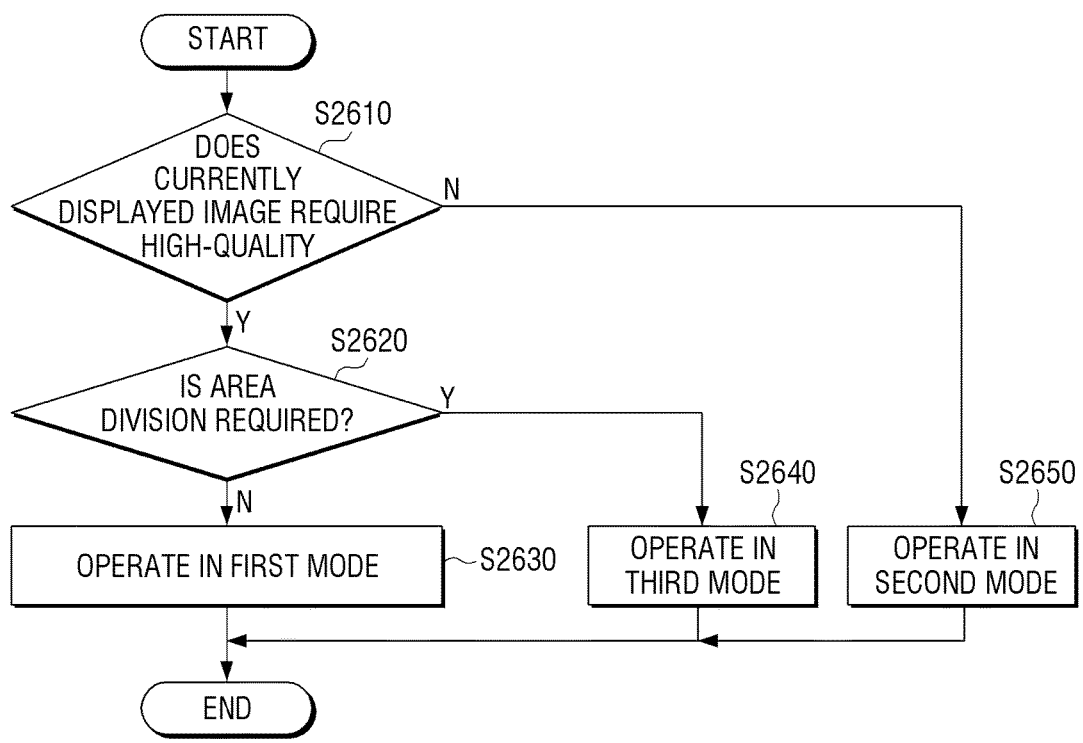

FIG. 26 is a flowchart of a method of determining a display mode according to a displayed image, according to an exemplary embodiment.

In operation S2610, the electronic apparatus 100 determines whether a currently displayed image requires a high-quality content display. Here, the requirement of the high-quality content display may be a video display or a display of an image having a capacity and a resolution higher than or equal to a preset value.

If it is determined in operation S2610 that the high-quality content display is not required, the electronic apparatus 100 operates in a second mode to provide an image through the transparent display 120 in operation S2650.

If it is determined in operation S2610 that the high-quality content display is required, the electronic apparatus 100 determines whether an area division is required in operation S2620. In other words, the electronic apparatus 100 may determine whether high-quality contents are displayed in all areas of an input image.

If it is determined in operation S2620 that the area division is not required, i.e., high-quality contents are displayed in all areas, the electronic apparatus 100 may operate in a first mode to provide an image through the emissive display 110.

If it is determined in operation S2620 that the area division is required, that is, for example, high-quality contents are not displayed in some areas, the electronic apparatus 100 may operate in a third mode to provide an image in an area, which displays a high-quality content, through the emissive display 110 and provide an image in an other area through the transparent display 120.

According to various exemplary embodiments as described above, an electronic apparatus may provide an image to a user by using an optimum display according to a situation. In other words, the electronic apparatus may minimize problems of an outside visibility, a power consumption, a heat emission, etc. through a dual display structure.

The above-described method may be written as computer programs and may be implemented in general-use digital computers that execute the programs using a computer readable recording medium. A structure of data used in the above-described method may be recorded on a computer readable recording medium through several means. Examples of the computer readable recording medium include magnetic storage media (e.g., ROM, floppy disks, hard disks, etc.), optical recording media (e.g., CD-ROMs, or DVDs), etc.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electronic apparatus comprising:
   a proximity sensor;
   an emissive display configured to provide a first image;
   a transparent display disposed on the emissive display and configured to provide a second image; and
   a processor configured to control the emissive display to provide the first image according to first mode and control the transparent display to provide the second image according to a second mode,
   wherein the processor is configured to operate according to the first mode in response to determining, through the proximity sensor, that the user is moving toward the electronic apparatus and is located within a predetermined distance from the electronic apparatus, and to operate according to the second mode in response to determining, through the proximity sensor, that the user is not moving toward the electronic apparatus and is not located within a predetermined distance from the electronic apparatus.

2. The electronic apparatus of claim 1, wherein the processor is configured to selectively operate according to one mode from among the first mode and the second mode based on a type of an application being run by the processor.

3. The electronic apparatus of claim 2, wherein the processor is configured to operate according to the first mode in response to a first application being run, and to operate according to the second mode in response to a second application being run, and
wherein the first application is associated with a high-quality image, and the second application is associated with a low-quality image.

4. The electronic apparatus of claim 1, further comprising:
an illuminance sensor configured to acquire an illuminance value of an environment surrounding the electronic apparatus,
wherein the processor is configured to selectively operate according to one mode from among the first mode and the second mode based the illuminance value acquired by the illuminance sensor.

5. The electronic apparatus of claim 4, wherein the processor is configured to operate according to the first mode if the acquired illuminance value is less than a preset value, and to operate according to the second mode if the acquired illuminance value is higher than or equal to the preset value.

6. The electronic apparatus of claim 1, wherein the second mode is a standby mode, and
wherein in response to receiving an unlock interaction while the processor operates according to the second mode, the processor is configured to operate according to the first mode.

7. The electronic apparatus of claim 1, further comprising:
a touch sensor configured to sense a user touch,
wherein in response to the touch sensor sensing the user touch while the processor operates according to the second mode, the processor is configured to operate according to the first mode.

8. The electronic apparatus of claim 1, wherein the processor is configured to operate according to a third mode, wherein the processor is configured to control the emissive display to provide the first image in a first area of the emissive display, and to control the transparent display to provide the second image in a second area of the transparent display.

9. The electronic apparatus of claim 1, wherein the emissive display comprises an organic light-emitting diode (OLED), and the transparent display comprises a cholesteric liquid crystal (CLC) display.

10. The electronic apparatus of claim 1, further comprising:
a sensor configured to sense a direction of a user gaze,
wherein the processor is configured to operate according to the first mode in response to determining that the user is looking at the electronic apparatus based on the direction, and to operate according to the second mode in response to determining that the user is not looking at the electronic apparatus based on the direction.

11. The electronic apparatus of claim 1, further comprising a touch sensor configured to sense a user touch, wherein the touch sensor is disposed between the emissive display and the transparent display.

12. The electronic apparatus of claim 1, further comprising a touch sensor configured to sense a user touch,
wherein the transparent display is disposed on a first side of the emissive display, and
wherein the touch sensor is disposed on a second side of the emissive display, the second side being opposite the first side.

13. A method of controlling an electronic apparatus, the method comprising:
sensing a user;
operating the electronic apparatus according to a first mode in response to determining that the user is moving toward the electronic apparatus and is located within a predetermined distance from the electronic apparatus, based on the sensed user; and
operating the electronic apparatus according to a second mode in response to determining that the user is not moving toward the electronic apparatus and is not located within a predetermined distance from the electronic apparatus, based on the sensed user;
wherein the electronic apparatus operating in the first mode provides a first image through an emissive display; and
wherein the electronic apparatus operating in the second mode provides a second image through a transparent display disposed on the emissive display.

14. The method of claim 13, wherein the electronic apparatus operates the first mode or the second mode according to a type of an application being run by the electronic apparatus.

15. The method of claim 14, further comprising
operating the electronic apparatus according to the first mode in response to a first application being run; and
operating the electronic apparatus according to the second mode in response to a second application being run,
wherein the first application is associated with a high-quality image, and the second application is associated with a low-quality image.

16. The method of claim 13, further comprising:
acquiring an illuminance value of an environment surrounding the electronic apparatus, and
operating the electronic apparatus according to one from among the first mode and the second mode based on the acquired illuminance value.

17. The method of claim 16, further comprising:
operating the electronic apparatus according to the first mode and providing the first image through the emissive display when the acquired illuminance value is lower than a preset value; and
operating the electronic apparatus according to the second mode and providing the second image through the emissive display when the acquired illuminance value is higher than or equal to the preset value.

18. The method of claim 13, wherein the second mode is a standby mode, and
wherein the method further comprises: in response to an unlock interaction being sensed while operating the electronic apparatus according to the second mode, operating the electronic apparatus according to the first mode.

19. The method of claim 13, further comprising:
in response to a user touch being sensed through a touch sensor while operating the electronic apparatus according to the second mode, operating the electronic apparatus according to the first mode.

20. The method of claim 13, further comprising:
operating the electronic apparatus according to a third mode and providing the first image in a first area of the emissive display and simultaneously providing the second image in a second area of the transparent display.

21. The method of claim 13, wherein the emissive display includes an organic light-emitting diode (OLED), and the transparent display includes a cholesteric liquid crystal (CLC) display.

\* \* \* \* \*